United States Patent
Chendamarai Kannan et al.

(10) Patent No.: US 10,925,090 B2
(45) Date of Patent: Feb. 16, 2021

(54) ON-DEMAND LISTEN-BEFORE-TALK

(71) Applicant: QUALCOMM Incorporated, San Diego, CA (US)

(72) Inventors: Arumugam Chendamarai Kannan, San Diego, CA (US); Ahmed Kamel Sadek, San Diego, CA (US); Aleksandar Damnjanovic, Del Mar, CA (US); Sanaz Barghi, Carlsbad, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 3 days.

(21) Appl. No.: 16/140,431

(22) Filed: Sep. 24, 2018

(65) Prior Publication Data

US 2019/0104546 A1   Apr. 4, 2019

Related U.S. Application Data

(60) Provisional application No. 62/566,095, filed on Sep. 29, 2017, provisional application No. 62/575,776, filed on Oct. 23, 2017.

(51) Int. Cl.
*H04W 74/08* (2009.01)
*H04B 7/06* (2006.01)
(Continued)

(52) U.S. Cl.
CPC ...... *H04W 74/0808* (2013.01); *H04B 7/0617* (2013.01); *H04B 7/0695* (2013.01);
(Continued)

(58) Field of Classification Search
CPC .................................................. H04W 74/0808
See application file for complete search history.

(56) References Cited

U.S. PATENT DOCUMENTS

2009/0022162 A1* 1/2009 Oksman .............. H04L 12/4035
                                                      370/400
2015/0055525 A1* 2/2015 Ma ........................ H04W 24/02
                                                      370/281
(Continued)

FOREIGN PATENT DOCUMENTS

EP          1912389 A1    4/2008
WO    WO-2011063295 A1    5/2011

OTHER PUBLICATIONS

Cisco Systems Belgium: "Cisco proposal how to implement the 5.8 GHz channels into EN 301 893", ETSI Draft; BRAN(17)000115, European Telecommunications Standards Institute (ETSI), 650, Route Des Lucioles ; F-06921 Sophia-Antipolis ; France; vol. TC-BRAN-Broadband Radio Access Networks, Sep. 6, 2017, pp. 1-124, XP014299212, Retrieved from the Internet: URL:docbox. etsi.org\BRAN\BRAN\05-CONTRIBUTIONS\2017\BRAN(17)000115_Cisco_proposal_how_to_implement_the_5_8_GHz_channels_into_EN.docx [retrieved on Sep. 6, 2017].

(Continued)

*Primary Examiner* — Jason E Mattis
(74) *Attorney, Agent, or Firm* — Liem T. Do

(57) ABSTRACT

Methods, systems, and devices for wireless communications are described. A wireless device may determine an interference status of each beam configuration of a plurality of active beam configurations for a shared radio frequency spectrum band. The wireless device may determine a beam-specific listen-before-talk (LBT) requirement for each beam configuration of the plurality of active beam configurations based at least in part on the determined interference status of each beam configuration. The wireless device may selectively enable an LBT procedure on a per-beam basis accord- (Continued)

ing to the determined beam-specific LBT requirement for each beam configuration.

30 Claims, 15 Drawing Sheets

(51) Int. Cl.
    *H04B 17/345*    (2015.01)
    *H04W 16/14*     (2009.01)
    *H04W 24/10*     (2009.01)
    *H04W 72/04*     (2009.01)
    *H04W 72/08*     (2009.01)
    *H04B 7/0413*    (2017.01)
    *H04L 5/00*      (2006.01)

(52) U.S. Cl.
    CPC .......... *H04B 17/345* (2015.01); *H04W 16/14* (2013.01); *H04W 24/10* (2013.01); *H04W 72/046* (2013.01); *H04W 72/082* (2013.01); *H04B 7/0413* (2013.01); *H04L 5/001* (2013.01)

(56) References Cited

U.S. PATENT DOCUMENTS

| | | | |
|---|---|---|---|
| 2015/0163036 A1* | 6/2015 | Thomas | H04L 5/0044 370/281 |
| 2016/0192395 A1 | 6/2016 | Yoo et al. | |
| 2016/0360553 A1* | 12/2016 | Cheng | H04W 4/08 |
| 2017/0171887 A1* | 6/2017 | Shi | H04W 16/14 |
| 2017/0188314 A1 | 6/2017 | Mueck et al. | |
| 2017/0202022 A1* | 7/2017 | Chendamarai Kannan | H04W 74/0816 |
| 2018/0115996 A1* | 4/2018 | Si | H04W 74/0816 |
| 2018/0184457 A1* | 6/2018 | Islam | H04B 7/0697 |
| 2018/0338326 A1* | 11/2018 | Sadek | H04W 56/0095 |

OTHER PUBLICATIONS

International Search Report and Written Opinion—PCT/US2018/052698—ISA/EPO—dated Dec. 17, 2018.

* cited by examiner

ON-DEMAND LISTEN-BEFORE-TALK

CROSS REFERENCES

The present Application for Patent claims the benefit of U.S. Provisional Patent Application No. 62/566,095 by CHENDAMARAI KANNAN, et al., entitled "ON-DEMAND LISTEN-BEFORE-TALK," filed Sep. 29, 2017 and to U.S. Provisional Patent Application No. 62/575,776 by CHENDAMARAI KANNAN et al, entitled "LISTENING GAPS AND RATE CONTROL OPTIMIZATIONS" filed Oct. 23, 2017 and assigned to the assignee hereof, and expressly incorporated herein.

BACKGROUND

The following relates generally to wireless communication, and more specifically to on-demand listen-before-talk (OD-LBT).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Wireless communication systems may operate in millimeter wave (mmW) frequency ranges, e.g., 28 GHz, 40 GHz, 60 GHz, etc. Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from the base station and/or the UE may be beamformed. Moreover, a receiving device may use beamforming techniques to configure antenna(s) and/or antenna array(s) such that transmissions are received in a directional manner.

mmW wireless communication systems, while promising, present new challenges to old questions. Conventional considerations in developing wireless communication systems focus primarily on avoiding interference between communication devices, often at the expense of reuse. Thus, devices would elect to avoid transmitting out of concerns for interfering with neighboring devices, and the associated transmission opportunity would be wasted. Interference in a mmW wireless communication system, however, is different than in a non-mmW wireless communication system, e.g., such as within a conventional cell coverage area of a base station. For example, beamformed transmissions may have varying beam configurations such that each beam may have a different beam width, a different beam direction, etc. Generally, a narrow beam width may have a relatively deep, but narrow coverage area whereas a wider beam width may have a relatively shallow, but wide coverage area. The "coverage area" (or footprint) within the context of a beamformed transmission may vary from one transmission to the next. Detecting the presence (e.g., for interference detection/ avoidance, capturing the medium, and the like) of a narrow beam width may be difficult for a device to the left or right of the narrow beam coverage area. Similarly, detecting the presence of a wider beam may be difficult for a device just outside of the wide, but shallow coverage area. Thus, the directionality and configuration of transmit and receive beams provide a certain level of interference isolation in a mmW wireless communication systems. Conventional interference detection/medium access techniques would likely fail in such circumstances.

SUMMARY

The described techniques relate to improved methods, systems, devices, or apparatuses that support on-demand listen-before-talk (OD-LBT). Generally, the described techniques provide for a wireless device to enable an OD-LBT procedure on a per-beam basis. For example, the wireless device (e.g., a base station and/or a user equipment (UE)) may have a plurality of active beam configurations. An active beam configuration may include a beam configuration that the device is actively using for communications with another wireless device, e.g., rather than any possible beam configuration that the device could be configured to use, and, in some instances, actively using within a time period. The wireless device may determine the interference status of each active beam and, based on the interference status, determine the listen-before-talk (LBT) requirement for the beam configuration. When the interference status indicates that an LBT requirement includes an LBT procedure, the wireless device may enable the LBT procedure for that beam configuration. In some aspects, the wireless device may use a periodic interference discovery procedure to identify the interference status for each beam configuration and enable the LBT procedure for a particular active beam configuration for certain time period, e.g., the LBT procedure may be enabled for the active beam configuration for the duration of the period of the interference discovery procedure. In some aspects, each wireless device communicating using active beam configurations may perform its own interference discovery procedure for each active beam configuration.

A method of wireless communication is described. The method may include determining an interference status of each beam configuration of a plurality of active beam configurations for a shared radio frequency spectrum band, determining a beam-specific LBT requirement for each beam configuration of the plurality of active beam configurations based at least in part on the determined interference status of each beam configuration, and selectively enabling an LBT procedure on a per-beam basis according to the determined beam-specific LBT requirement for each beam configuration.

An apparatus for wireless communication is described. The apparatus may include means for determining an interference status of each beam configuration of a plurality of active beam configurations for a shared radio frequency spectrum band, means for determining a beam-specific LBT requirement for each beam configuration of the plurality of active beam configurations based at least in part on the determined interference status of each beam configuration, and means for selectively enabling an LBT procedure on a per-beam basis according to the determined beam-specific LBT requirement for each beam configuration.

Another apparatus for wireless communication is described. The apparatus may include a processor, memory in electronic communication with the processor, and instructions stored in the memory. The instructions may be operable to cause the processor to determine an interference status of each beam configuration of a plurality of active beam configurations for a shared radio frequency spectrum band, determine a beam-specific LBT requirement for each beam configuration of the plurality of active beam configurations based at least in part on the determined interference status of each beam configuration, and selectively enable an LBT procedure on a per-beam basis according to the determined beam-specific LBT requirement for each beam configuration.

A non-transitory computer-readable medium for wireless communication is described. The non-transitory computer-readable medium may include instructions operable to cause a processor to determine an interference status of each beam configuration of a plurality of active beam configurations for a shared radio frequency spectrum band, determine a beam-specific LBT requirement for each beam configuration of the plurality of active beam configurations based at least in part on the determined interference status of each beam configuration, and selectively enable an LBT procedure on a per-beam basis according to the determined beam-specific LBT requirement for each beam configuration.

In some examples of the method, apparatus, and non-transitory computer-readable medium described herein, determining the interference status of each beam configuration of the plurality of active beam configurations includes: performing a periodic interference discovery procedure using each beam configuration of the plurality of active beam configurations to determine whether a transmission by the first wireless device to a second wireless device using that beam configuration causes interference to a third wireless device.

In some examples of the method, apparatus, and non-transitory computer-readable medium described herein, performing the interference discovery procedure includes: transmitting, during an interference discovery window, an interference discovery signal for each beam configuration of the plurality of active beam configurations. Some examples of the method, apparatus, and non-transitory computer-readable medium described herein may further include processes, features, means, or instructions for receiving, during the interference discovery window and based at least in part on the interference discovery signal, an LBT request signal identifying at least one beam configuration of the plurality of active beam configurations. Some examples of the method, apparatus, and non-transitory computer-readable medium described herein may further include processes, features, means, or instructions for enabling, during the interference discovery window and for a period extending until a next periodic interference discovery window, the LBT procedure for the identified beam configuration based at least in part on the LBT request signal.

In some examples of the method, apparatus, and non-transitory computer-readable medium described herein, the LBT request signal may be received from the third wireless device.

In some examples of the method, apparatus, and non-transitory computer-readable medium described herein, the LBT request signal may be received from the second wireless device, the second wireless device forwarding the request from the third wireless device.

In some examples of the method, apparatus, and non-transitory computer-readable medium described herein, the identified at least one beam configuration includes an uplink beam configuration.

In Some examples of the method, apparatus, and non-transitory computer-readable medium described herein, LBT request signals from different operators may be associated with orthogonal resources.

In some examples of the method, apparatus, and non-transitory computer-readable medium described herein, the LBT request signal includes at least one of a bit or field indicating that the identified at least one beam configuration causes interference, or a transmit power indication, or an acceptable interference level indication, or an acceptable interference rank, or a combination thereof.

Some examples of the method, apparatus, and non-transitory computer-readable medium described herein may further include processes, features, means, or instructions for enabling the LBT procedure for the identified at least one beam configuration for a time period between repeated interference discovery windows.

In some examples of the method, apparatus, and non-transitory computer-readable medium described herein, the interference discovery signal includes at least one of: a synchronization signal, or a channel state information reference signal, or a downlink on-demand LBT reference signal, or a sounding reference signal, or an uplink on-demand LBT reference signal, or a combination thereof.

Some examples of the method, apparatus, and non-transitory computer-readable medium described herein may further include processes, features, means, or instructions for determining that the LBT procedure may be enabled for a threshold amount of the plurality of active beam configurations. Some examples of the method, apparatus, and non-transitory computer-readable medium described herein may further include processes, features, means, or instructions for enabling the LBT procedure on all of the available active beam configurations based at least in part on the determination.

In some examples of the method, apparatus, and non-transitory computer-readable medium described herein, determining the interference status of each beam configuration of the plurality of active beam configurations includes: selecting a different energy detection threshold or preamble detection threshold for each beam configuration of the plurality of active beam configurations.

Some examples of the method, apparatus, and non-transitory computer-readable medium described herein may further include processes, features, means, or instructions for identifying a first interference discovery window based at least in part on a first operator associated with the first wireless device. Some examples of the method, apparatus, and non-transitory computer-readable medium described herein may further include processes, features, means, or instructions for identifying a second interference discovery window based at least in part on a second operator that may be not associated with the first wireless device, where the first interference discovery window may be orthogonal in the time domain with respect to the second interference discovery window. In some examples of the method, apparatus, and non-transitory computer-readable medium described herein, the determining the interference status of each beam configuration of the plurality of active beam configurations may be based at least in part on the first interference discovery window and the second interference discovery window.

Some examples of the method, apparatus, and non-transitory computer-readable medium described herein may further include processes, features, means, or instructions for identifying a first interference discovery window associated with uplink transmissions. Some examples of the method, apparatus, and non-transitory computer-readable medium described herein may further include processes, features, means, or instructions for identifying a second interference discovery window associated with downlink transmissions, where the first interference discovery window may be orthogonal in the time domain with respect to the second interference discovery window. In some examples of the method, apparatus, and non-transitory computer-readable medium described herein, the determining the interference status of each beam configuration of the plurality of active beam configurations may be based at least in part on the first interference discovery window and the second interference discovery window.

In some examples of the method, apparatus, and non-transitory computer-readable medium described herein, the plurality of active beam configurations includes active beam configurations that may be available for transmission within a periodic schedule.

In some examples of the method, apparatus, and non-transitory computer-readable medium described herein, the plurality of active beam configurations include at least one of: uplink active beam configurations or downlink active beam configurations.

In some examples of the method, apparatus, and non-transitory computer-readable medium described herein, the LBT procedure includes at least one of: an energy detection based LBT procedure, a preamble detection based LBT procedure, or a receiver-centric LBT procedure.

DETAILED DESCRIPTION

Next generation wireless communication systems may rely on millimeter wave (mmW) communication technologies. mmW technologies typically use beamformed transmissions/receptions to provide directional communications. Each beamformed transmission/reception may have an associated beam configuration, such as a beam width, a beamforming configuration, a beam shape, and the like. A beam configuration may refer to a digital/analog antenna configuration that provides a directional transmission towards a receiving device, such as a user equipment (UE). A receive beam may refer to a digital/analog antenna configuration that provides directional reception of a beam from a transmitting device. For a beam pair used for wireless communications, the transmit beam may be the same as or different from the receive beam (e.g., due to beam reflection, diffraction, and the like).

mmW wireless communication systems present unique challenges with respect to interference management, medium access, and the like. For example, the directionality of transmissions and/or receptions prove a certain level of interference isolation in mmW systems. Moreover, mmW communications in an asynchronous (or partially synchronized) network also introduce unique challenges. Conventional design techniques may opt for transmission restraint to avoid interference, which may minimize channel reuse and lead to wasted resources.

Aspects of the disclosure are initially described in the context of a wireless communications system. Aspects of the disclosure provide varying techniques that, individually or in combination, support an on-demand listen-before-talk (OD-LBT) procedure that is selectively enabled on a per-beam basis for active beam configurations. For example, a wireless device may be using a plurality of beam configurations for active wireless communications with other wireless devices, e.g., uplink and/or downlink communications. The wireless device may determine, for each or some of the active beam configurations, an interference status for the beam. The wireless device may use the interference status for the particular beam configuration to determine a listen-before-talk (LBT) requirement for the beam, e.g., whether the channel is congested enough to warrant use of an LBT procedure before communicating on the channel. Based on the LBT requirement, the wireless device may enable the LBT procedure (e.g., an OD-LBT) for the beam configuration. In some examples, the wireless device determines the interference status for each beam according to a periodic interference discovery procedure and the LBT procedures are enabled until the next interference discovery procedure window.

Aspects of the disclosure are further illustrated by and described with reference to apparatus diagrams, system diagrams, and flowcharts that relate to OD-LBT.

Figure 1:
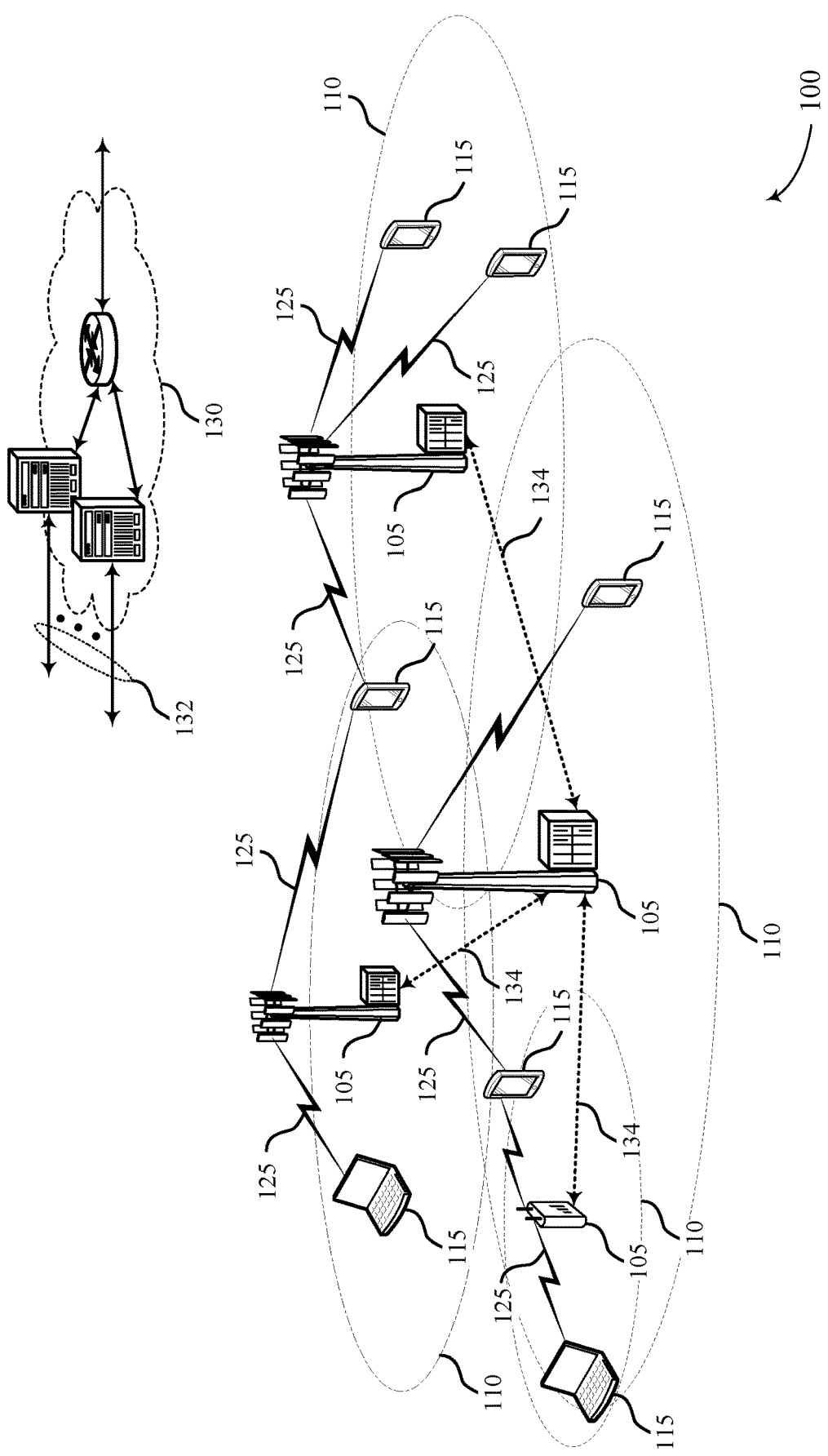
FIG. 1 illustrates an example of a system for wireless communication that supports OD-LBT in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR)

network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ LBT procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal FDM (OFDM) or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

A wireless device, e.g., a UE 115 and/or a base station 105, may determine an interference status of each beam configuration of a plurality of active beam configurations for a shared radio frequency spectrum band. The wireless device may determine a beam-specific LBT requirement for each beam configuration of the plurality of active beam configurations based on the determined interference status of each beam configuration. The wireless device may selectively enable an LBT procedure on a per-beam basis according to the determined beam-specific LBT requirement for each beam configuration.

Figure 2:
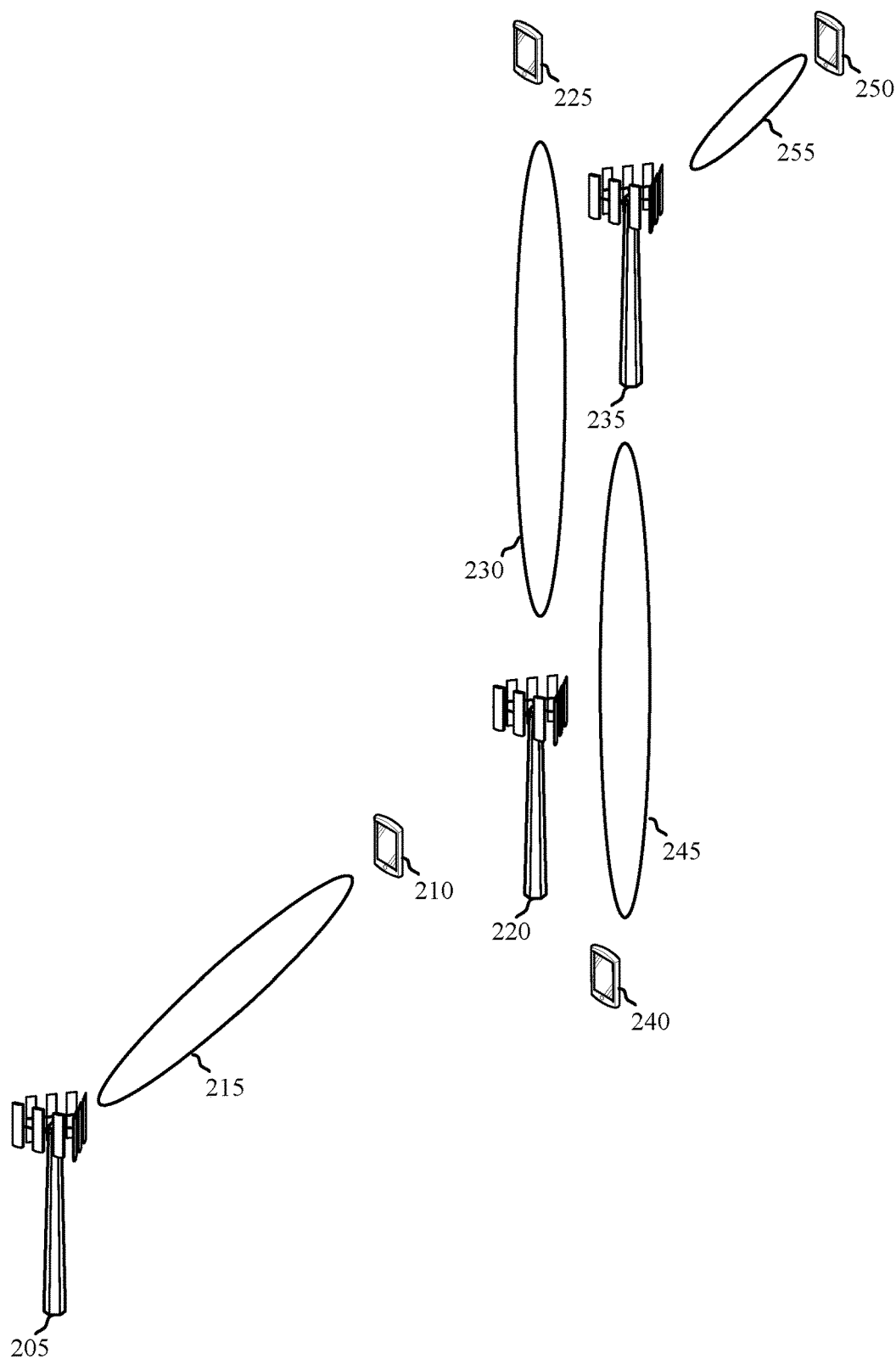
FIG. 2 illustrates an example of a system for wireless communication that supports OD-LBT in accordance with aspects of the present disclosure.

FIG. 2 illustrates an example of a wireless communication system 200 that supports OD-LBT in accordance with various aspects of the present disclosure. In some examples, wireless communication system 200 may implement aspects of wireless communications system 100. Wireless communication system 200 may include base stations 205, 220, and 235, and UEs 210, 225, 240, and 250, which may be examples of the corresponding devices described herein. Wireless communication system 200 may be a mmW wireless communication system.

Generally, base station 205 may be associated with UE 210, base station 220 may be associated with UE 225, and base station 235 may be associated with UEs 240 and 250. For example, base station 205 may communicate with UE 210 using beam configuration 215, base station 220 may communicate with UE 225 using beam configuration 230, and base station 235 may communicate with UE 240 using beam configuration 245 and with UE 250 using beam configuration 255. Beam configurations 215, 230, 245, and/or 255 may broadly refer to beamformed transmissions, where each beam configuration may include a transmit beam and/or a receive beam (e.g., a beam pair link). In some aspects, base stations 205, 220, and/or 235 may be associated with different operators such that inter-base station communications (e.g., for communication scheduling) may be absent.

Despite (or because of) the directionality of transmissions/receptions in a mmW wireless communication system, interference may be a complicated issue to manage. Traditionally, transmissions would span larger coverage areas (e.g., even intra-cell communications) such that channel capture may lead to unused resources out of concerns for interference. While this may be applicable in a mmW network, the issues of interference becomes more discrete in view of the directionality.

As one example, deafness may become more prevalent in a mmW wireless communication system than in a non-mmW wireless communication system. Broadly, deafness may refer to a neighboring device that does not "hear" a transmission from other devices, e.g., channel reservation transmissions, ongoing data communications, and the like. Generally, a device may be considered "deaf" when the device is tuned to a different beam direction at the time "t" (e.g., a time component) and/or the device is not listening (e.g., monitoring) the medium (e.g., a directional component) at the time t when a preamble was transmitted on the beam configuration attempting to contend for the channel at time t+k, e.g., channel reservation signaling for a future data transmission.

Generally, directional transmissions using beamformed transmissions/receptions may have an inherently lower probability of collision compared to omni-directional transmissions. Accordingly, silencing an interfering device may not always help with other transmissions. Thus, aspects of the described techniques may provide for a receiver oriented LBT procedure, e.g., the interference domain of the transmit beam may not be applicable to an interference domain of the receiver beam. However, employing an LBT procedure at all times may not provide the greatest advantages in a mmW network. For certain nodes/beam directions, enabling LBT may prove valuable. For others, the additional overhead/delay may be unnecessary in view of the directional nature of the beam configurations.

As one non-limiting example, an issue of deafness may arise in the context of beamformed communications between base station 220 and UE 225 and between base station 235 and UE 240. Generally, base station 235 may perform data communications with UE 250 without interfering with, or being interfered by, wireless communications from other UEs. That is, there may be no other UEs in or near the vicinity of UE 250 such that data communications using beam configuration 255 may not interfere with other devices/transmissions. However, a deafness issue may arise when base station 235 schedules data communications with UE 240. Base station 220 may have ongoing data communications with UE 225 using beam configuration 230. However, base station 235 and/or UE 240 may be deaf with regards to the ongoing data communications between base station 220 and UE 225. For example, base station 235 and/or UE 240 may be tuned to a different beam when the ongoing data communications were scheduled. Accordingly, transmissions from base station 235 and/or UE 240 may be interfered by, or interfere with the ongoing data communications.

Accordingly, aspects of the described techniques may provide for a per-beam OD-LBT procedure being selectively enabled for certain beam configurations for a period of time. The described techniques may be used by any of the devices of wireless communication system 200. As one example, base station 235 may have a plurality of active beam configurations, e.g., beam configurations 255 and 245. For each active beam configuration, base station 235 may determine an interference status for each beam configuration of the active beam configurations. Base station 235 may determine a beam-specific LBT requirement for each of the beam configurations 245 and 255 based on that beam's interference status. Base station 235 may selectively enable an LBT procedure on a per-beam basis according to the LBT requirement for the beam. For example, base station 235 may enable an LBT procedure for beam configuration 245 (e.g., based on interference associated with the ongoing communications between base station 220 and UE 225), but may not enable an LBT procedure for beam configuration 255 (e.g., due to no neighboring devices).

Some or all of the other devices may also selectively enable a per-beam OD-LBT procedure for their respective active beam configurations. For example, UE 250 may determine whether to enable an LBT procedure for beam configuration 255, base station 205 and/or UE 210 may determine whether to enable an LBT procedure for beam configuration 215, and so on. Base station 220 and UE 225 may each determine whether to enable an LBT procedure for beam configuration 230. As can be appreciated, any device that determines to enable an LBT procedure for an active beam configuration may notify the associated other device of the active LBT procedure being enabled for the beam configuration.

Thus, wireless communication system 200 may support a semi-static interference discovery procedure (e.g., radio resource management (RRM) measurements) to enable OD-LBT, when needed. Dynamic (e.g., per-transmission) LBT may be enabled on selective beam directions which were discovered by the semi-static procedure. In some aspects, OD-LBT in accordance with aspects of the present disclosure involves the participation of the victim node in the LBT activation process, e.g., the victim node may provide an LBT request message to the wireless device.

Figure 3:
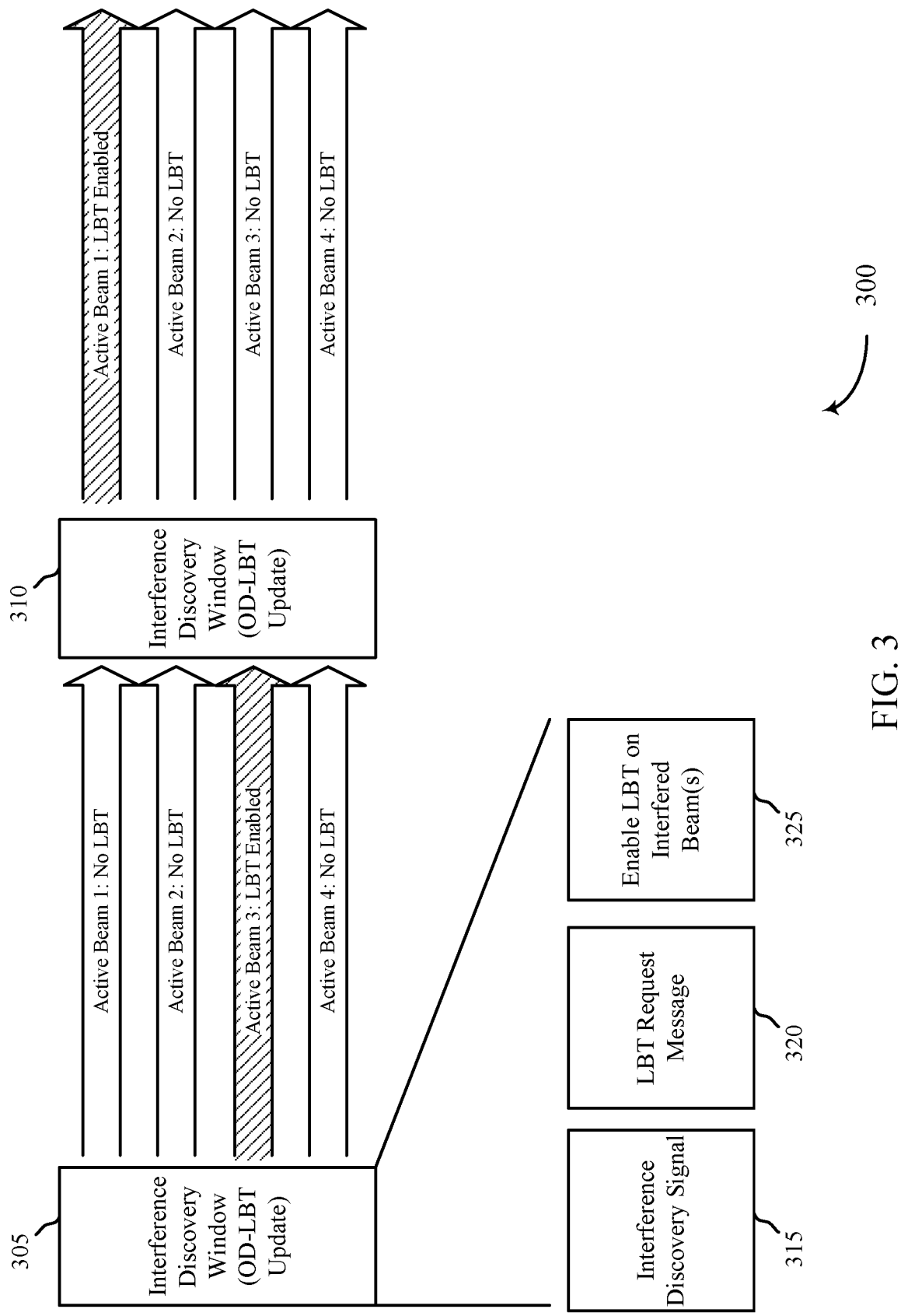
FIG. 3 illustrates an example of a periodic interference discovery procedure that supports OD-LBT in accordance with aspects of the present disclosure.

FIG. 3 illustrates an example of a periodic interference discovery procedure 300 that supports OD-LBT in accordance with various aspects of the present disclosure. In some examples, periodic interference discovery procedure 300 may implement aspects of wireless communication systems 100/200. Aspects of periodic interference discovery procedure 300 may be implemented by a wireless device, such as a base station and/or UE, which may be examples of the corresponding devices described herein.

Generally, periodic interference discovery procedure 300 illustrates one example of a per-beam OD-LBT procedure in accordance with aspects of the present disclosure. For example, periodic interference discovery procedure 300 may illustrate a periodic interference discovery procedure that can be used to determine whether transmissions may interfere with other devices. The periodic interference discovery procedure 300 may include a first interference discovery window 305 where LBT procedures are selectively enabled on a per-beam basis, and a second interference discovery window 310 where LBT procedures are again selectively enabled on the same or different beams on a per-beam basis. The LBT procedures enabled for particular beam(s) during each interference discovery window may be enabled for a certain time period, e.g., until the next interference discovery window. The interference discovery windows may occur every t ms, in some examples.

In some aspects, each interference discovery window may include the device transmitting an interference discovery signal 315, receiving an LBT request message 320, and enabling an LBT procedure 325 on interfered beam(s). The interference discovery signal 315 may include any signal transmitted using the particular beam configuration that can be used by a listening device to determine if the transmission would cause interference. The wireless device may transmit, e.g., in a sequential manner, the interference discovery signal 315 on each active beam configuration (e.g., first on active beam 1, next on active beam 2, and so on). Examples of the signals that can be used as interference discovery signals 315 may include, but are not limited to, a synchronization signal, a reference signal, a downlink OD-LBT reference signal, an uplink OD-LBT reference signal, and the like. The wireless device transmitting the interference discovery signal 315 may be considered, in this context, as a potential aggressor node.

In response to the interference discovery signal 315, the wireless device may receive an LBT request message 320 for any active beam configuration that transmission on might cause interference. For example, the wireless device may transmit the interference discovery signal 315 on active beam configuration 1 and, due to no other device(s) determining that active beam configuration 1 causes interference, may not receive an LBT request message 320. However, the wireless device may transmit the interference discovery signal 315 on active beam configuration 3 and, due to another device determining that active beam configuration 3 causes interference, may receive an LBT request message 320 in response. In this context, the device responding with the LBT request message 320 may be considered a potential victim node. Accordingly, the wireless device may enable the LBT procedure on active beam 3, but not on active beam configurations 1, 2, and 4 (e.g., the active beam configurations in which the wireless device did not receive an LBT request message 320 in response to the interference discovery signal 315).

In some aspects, the wireless device may receive the LBT request message 320 directly or via a second wireless device. For example, in one scenario, the wireless device may be a base station that transmits the interference discovery signal 315 and then receives an LBT request message 320 from a victim node directly (e.g., from a neighboring UE or base station that the interference discovery signal 315 would cause interference to). As another example scenario, a UE may transmit the interference discovery signal 315 and receive an LBT request message 320 in response from a victim node directly. In this scenario, the UE may send an indication of the LBT request message 320 on to the base station. As yet another scenario, a base station may transmit the interference discovery signal 315 and receive the LBT request message 320 in response from an associated UE. That is, the UE may receive the LBT request message 320 from a neighboring victim node and forward the LBT request message 320 on to the base station.

As discussed, the LBT procedure may be enabled on a per-beam basis and may be enabled for a certain time period. For example, the LBT procedure may be enabled on an active beam configuration until the next upcoming second interference discovery window. Thus, during the second interference discovery window 310 the wireless device may again perform the periodic interference discovery procedure to determine which active beam configurations, if any, have an interference status that warrants an LBT requirement enabling the LBT procedure. Also, the LBT procedure may be enabled on the per-beam basis, which may change between each instance of the second interference discovery window. For example, during the second interference discovery window 310 the LBT procedure may be disabled for active beam 3 and enabled for active beam 1.

Thus, periodic interference discovery procedure 300 may provide for semi-static determination of LBT beam directions through a higher layer assisted discovery process (interference discovery windows, which may be known, e.g., 1 ms out of every 40 ms). During each interference discovery window, each of the active beam configurations may be swept sequentially and repeated N times. Potential victim nodes may also report other interfering transmissions other than the interference discovery signal. The LBT procedure may be enabled dynamically on select "problematic" beam directions for the next "T" ms. In some aspects, the interference discovery window may include a downlink reference signal (DRS) measurement timing configuration (DMRS) window, a high-priority window (HPW), and the like.

In some cases, during the interference discovery window, potential victim nodes may listen to the interference discovery signal 315 sweep. Victim nodes which observe interference (e.g., greater than a threshold) may respond with an LBT request message 320, e.g., random access channel (RACH) signaling used to identify the aggressor direction. The victim nodes may be a UE or a base station, in general belonging to same or different operators. Nodes that receive the LBT request message 320 may activate an LBT procedure on the active beams before transmissions.

In some examples, victim nodes may transmit an LBT request signal identifying themselves as victims to the aggressor nodes. The LBT request message 320 may contain information such as, transmit power, tolerable interference level, tolerable interference rank, beam directions, etc. Potential aggressor nodes (i.e., other operators UEs/base stations) may listen for an LBT request signal at a designated time location that is mapped one-to-one with the OD-LBT reference signal, e.g., the interference discovery signal 315.

In some aspects for a UE aggressor node, during the interference discovery procedure the victim nodes may report to a potential UE aggressor (uplink). The UEs that identify themselves as aggressors through receiving an LBT request signal may notify the serving base station to enable LBT on the beam configuration for future uplink transmissions. Aggressor base stations may activate an LBT procedure in the appropriate direction of transmissions (downlink or uplink or both).

Figure 4A:
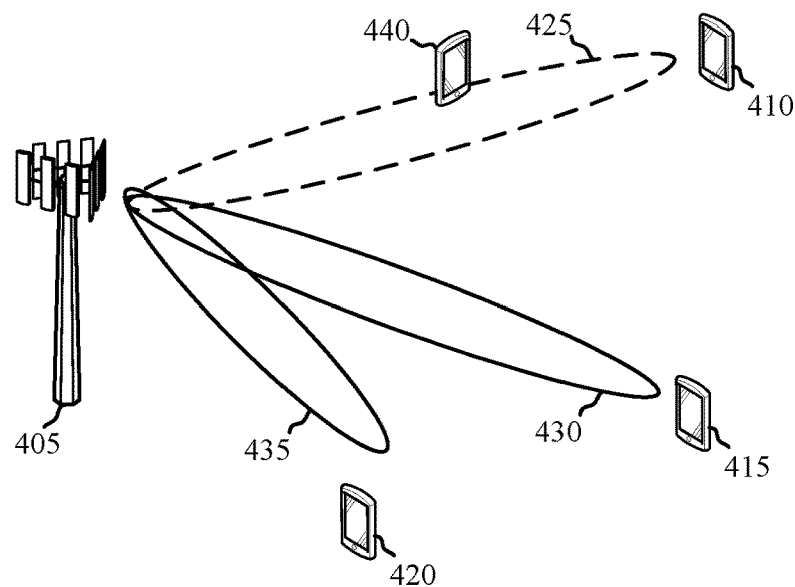
FIGS. 4A and 4B illustrate examples of a system for wireless communication that supports OD-LBT in accordance with aspects of the present disclosure.
Figure 4B:
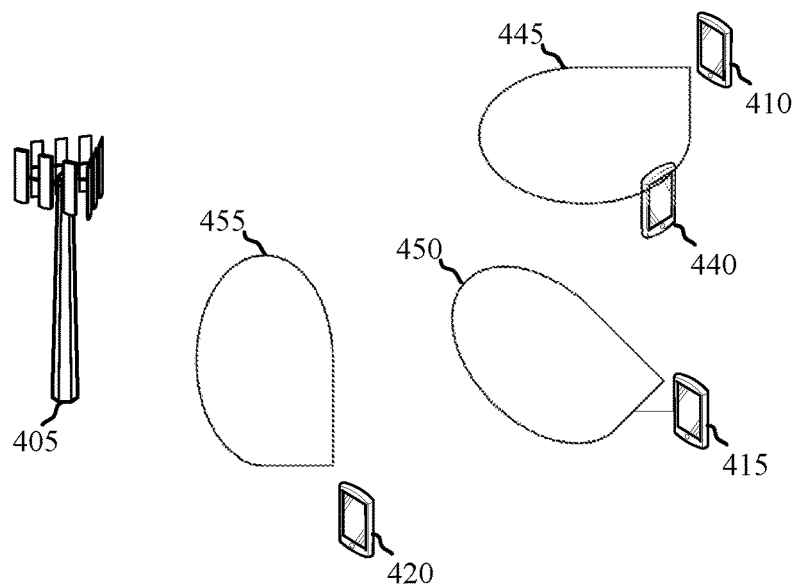

FIGS. 4A and 4B illustrate examples of a wireless communication system 400 that supports OD-LBT in accordance with various aspects of the present disclosure. In some examples, wireless communication system 400 may implement aspects of wireless communication systems 100/200 and/or periodic interference discovery procedure 300. Wireless communication system 400 may include a base station 405 and UEs 410, 415, and 420, which may be examples of the corresponding devices described herein. Generally, wireless communication system 400-a illustrates an example downlink communication scenario and wireless communication system 400-b illustrates an example uplink communication scenario. Wireless communication system 400 may be a mmW wireless communication system.

Generally, base station 405 may be associated with UEs 410, 415, and 420. For example, base station 405 may communicate with UE 410 in the downlink using beam configuration 425 and in the uplink using beam configuration 445. Base station 405 may communicate with UE 415 in the downlink using beam configuration 430 and in the uplink using beam configuration 450. Base station 405 may communicate with UE 420 in the downlink using beam configuration 435 and in the uplink using beam configuration 455. Generally, UE 440 may be considered a victim node in that, in some scenarios, communications between base station 405 and certain UEs associated with base station 405 may interfere with UE 440.

Base station 405 may determine an interference status for each of beam configurations 425, 430, and 435. Based on the interference status for each active beam configuration, base station 405 may determine a beam-specific LBT requirement for each beam configuration. Base station 405 may selectively enable an LBT procedure on a per-beam basis according to the LBT requirement for each beam configuration.

For example, and during an interference discovery window, base station 405 may transmit an interference discovery signal using beam configuration 425. UE 440 may receive the interference discovery signal and determine that beam configuration 425 may cause interference. In response, UE 440 may respond by transmitting an LBT request signal to base station 405. The LBT request signal may include information indicating to base station 405 that beam configuration 425 may cause interference for UE 440, e.g., UE 440 may transmit a beam configuration identifier. The LBT request signal may also include additional information, such as an acceptable interference level for UE 440, an acceptable interference rank for UE 440, a transmit power indication, and the like. Based on the LBT request signal, base station 405 may selectively enable an LBT procedure on beam configuration 425 for a time period, e.g., until the next interference discovery window. Base station 405 may transmit an indication to UE 410 that the LBT procedure has been enabled for beam configuration 425.

For the remaining active beam configurations 430 and 435, base station 405 may also transmit interference discovery signals and, due to no victim nodes being within the respective coverage areas, may not receive an LBT request signal. Accordingly, base station 405 may not enable an LBT procedure for beam configurations 430 and 435.

In some aspects, an NR synchronization signal or a channel state information reference signal (CSI-RS) may be reused as the interference discovery signal. In some examples, a downlink OD-LBT reference signal may be used as the interference discovery signal.

Each of the UEs 410, 415, and 420 may also selectively enable an LBT procedure on a per-beam basis using the interference discovery procedure. For example, UE 410 may transmit an interference discovery signal using beam configuration 445. UE 440 may receive the interference discovery signal and determine that beam configuration 445 may cause interference. In response, UE 440 may respond by transmitting an LBT request signal to UE 410. The LBT request signal may include information indicating to UE 410 that beam configuration 445 may cause interference for UE 440, e.g., beam configuration identifier. The LBT request signal may also include additional information, such as an acceptable interference level for UE 440, an acceptable interference rank for UE 440, a transmit power indication, and the like. Based on the LBT request signal, UE 410 may selectively enable an LBT procedure on beam configuration 445 for a time period, e.g., until the next interference discovery window. UE 410 may transmit an indication to base station 405 that the LBT procedure has been enabled for beam configuration 445.

For the remaining active beam configurations 450 and 455, UEs 415 and 420 may also each transmit interference discovery signals and may not receive an LBT request signal (e.g., due to no victim nodes being within the respective coverage areas). Accordingly, UEs 415 and 420 may not enable an LBT procedure for beam configurations 450 and 455, respectively.

Figure 5:
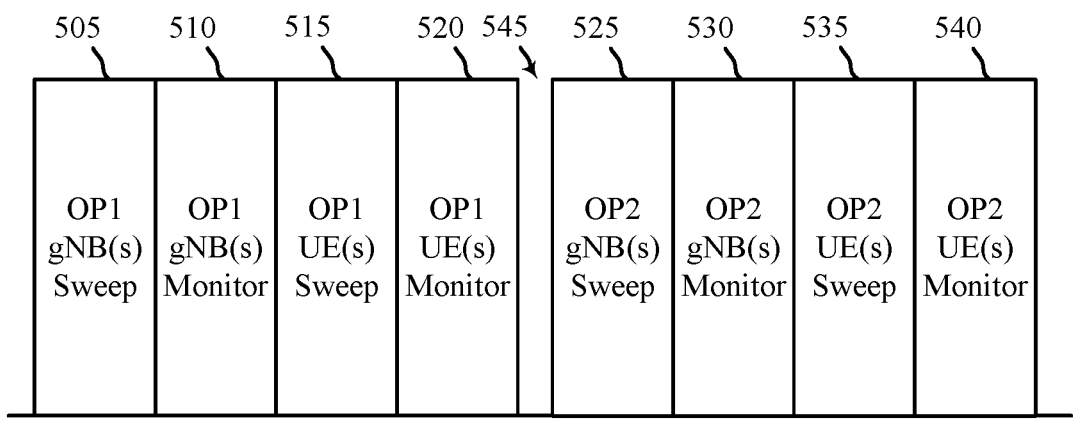
FIG. 5 illustrates an example of a timing diagram that supports on-demand listen-before-talk (OD-LBT) in accordance with aspects of the present disclosure.

FIG. 5 illustrates an example of a timing diagram 500 that supports OD-LBT in accordance with various aspects of the present disclosure. In some examples, timing diagram 500 may implement aspects of wireless communication systems 100/200/400 and/or periodic interference discovery procedure 300. Aspects of timing diagram 500 may be implemented by a wireless device, such as a UE or base station, which may be examples of the corresponding devices described herein.

Generally, an interference discovery window may be staggered on a per-operator basis, e.g., in a non-overlapping manner. Timing diagram 500 illustrates one example of staggering the interference discovery windows in the time domain based on the operator.

For example, during period 505, each of the base stations associated with operator 1 may transmit their interference discovery signals using an active beam configuration. During period 510, each of the base stations associated with operator 1 may then listen for LBT request messages transmitted in response to the interference discovery signal transmissions. During period 515, each of the UEs associated with operator 1 may transmit their interference discovery signals using an active beam configuration. During period 520, each of the UEs associated with operator 1 may then listen for LBT request messages transmitted in response to the interference discovery signal transmissions.

During period 525, each of the base stations associated with operator 2 may transmit their interference discovery signals using an active beam configuration. During period 530, each of the base stations associated with operator 2 may then listen for LBT request messages transmitted in response to the interference discovery signal transmissions. During period 535, each of the UEs associated with operator 2 may transmit their interference discovery signals using an active beam configuration. During period 540, each of the UEs associated with operator 2 may then listen for LBT request messages transmitted in response to the interference discovery signal transmissions. A gap period 545 may be provided as a buffer between the interference discovery windows for different operators.

Based on receiving LBT request signal(s), the corresponding devices may selectively enable an LBT procedure on a per-beam basis for any interfering active beam configurations.

In some aspects, the interference discovery windows may be staggered based on the communication direction. For example, a similar approach may be used for uplink communications during a first portion of the interference discovery window and for downlink communications during a second portion of the interference discovery window. Thus, the interference discovery window may be staggered per transmission direction, e.g., in a non-overlapping direction.

Figure 6:
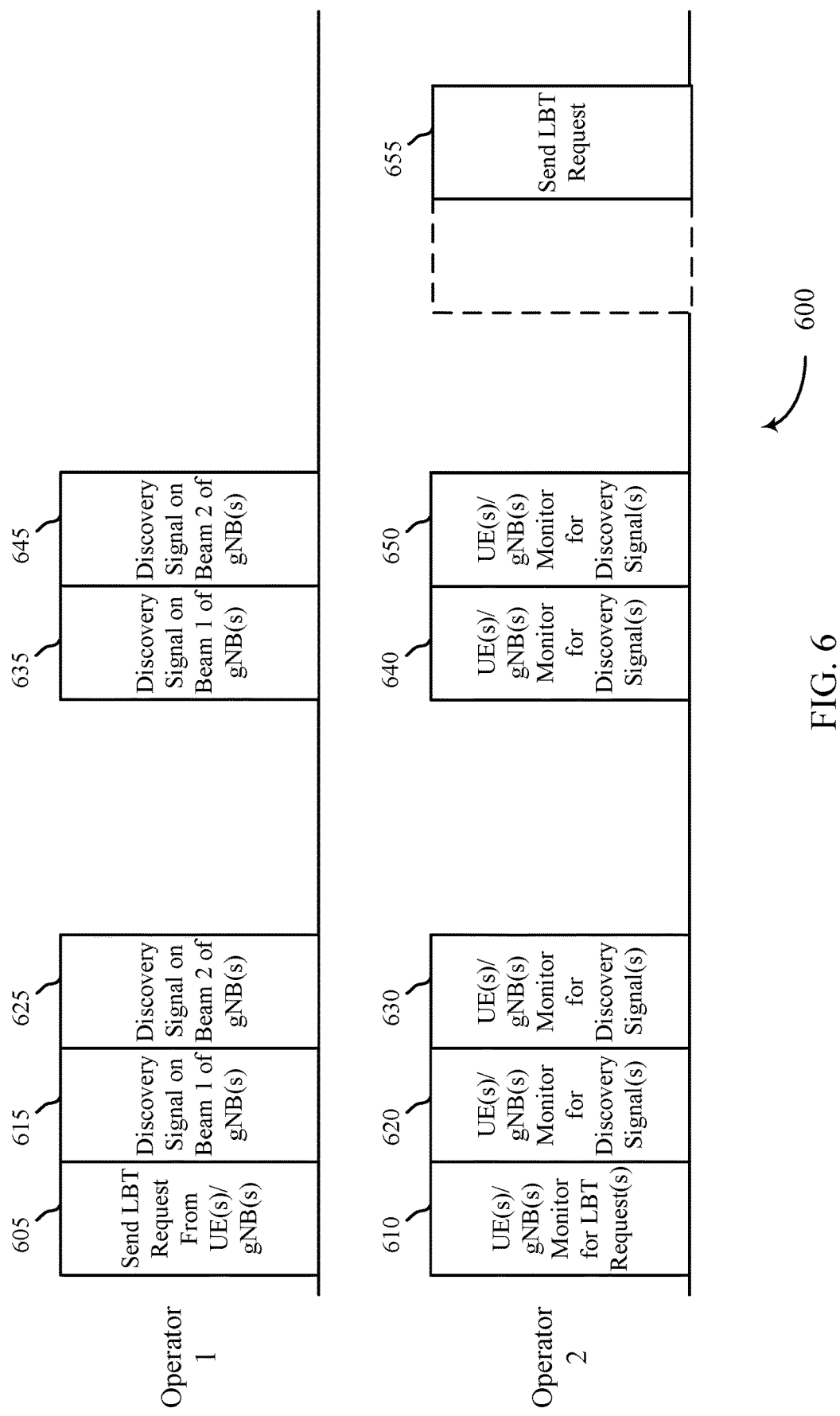
FIG. 6 illustrates an example of a timing diagram that supports OD-LBT in accordance with aspects of the present disclosure.

FIG. 6 illustrates an example of a timing diagram 600 that supports OD-LBT in accordance with various aspects of the present disclosure. In some examples, timing diagram 600 may implement aspects of wireless communication systems 100/200/400, periodic interference discovery procedure 300, and/or timing diagram 500. Aspects of timing diagram 600 may be implemented by a wireless device, such as a UE or base station, which may be examples of the corresponding devices described herein.

Generally, timing diagram 600 illustrates one example of a dedicated signaling scheme for aggressor/victim discovery between different operators. Timing diagram 600 illustrates one example of signaling defined for nodes of one operator to communicate with aggressors of another operator. Orthogonal resources may be provided for transmission of interference discovery signals between operators. Time, frequency and/or code multiplexing techniques per beam transmission of interference discovery signal may be used. Orthogonal resources may be provided for transmission of LBT request signals. Time, frequency and/or code multiplexing per beam transmission of LBT request response may be used. LBT response signals may be expected to be received by the aggressor node on the same beam as the interference discovery signal being transmitted. Aggressor UEs may notify their own base station of the reception of LBT request from a victim to enable LBT on future uplink transmissions. Timing diagram 600 includes UE-to-UE and base station-to-base station signaling.

During period 605, each of the base stations/UEs associated with operator 1 may transmit their LBT request signals. During overlapping period 610, each of the base stations/UEs associated with operator 2 may listen for LBT request signals from the nodes of operator 1. During period 615, each of the base stations associated with operator 1 may transmit their interference discovery signals on active beam configuration 1. During overlapping period 620, each of the base stations/UEs associated with operator 2 may listen for interference discovery signals on active beam configuration 1 from the nodes of operator 1. During period 625, each of the base stations associated with operator 1 may transmit their interference discovery signals on active beam configuration 2. During overlapping period 630, each of the base stations/UEs associated with operator 2 may listen for interference discovery signals on active beam configuration 2 from the nodes of operator 1.

During period 635, each of the base stations associated with operator 1 may transmit their interference discovery signals on active beam configuration 1. During overlapping period 640, each of the base stations/UEs associated with operator 2 may listen for interference discovery signals on active beam configuration 1 from the nodes of operator 1. During period 645, each of the base stations associated with operator 1 may transmit their interference discovery signals on active beam configuration 2. During overlapping period 650, each of the base stations/UEs associated with operator 2 may listen for interference discovery signals on active beam configuration 2 from the nodes of operator 1.

During period 655, each of the base stations/UEs associated with operator 2 may transmit their LBT request signals (if applicable) to the nodes of operator 1. The nodes of operator 1 may be scheduled to listen for the LBT request signals from the nodes of operator 2 during the period 655 (now shown).

Figure 7:
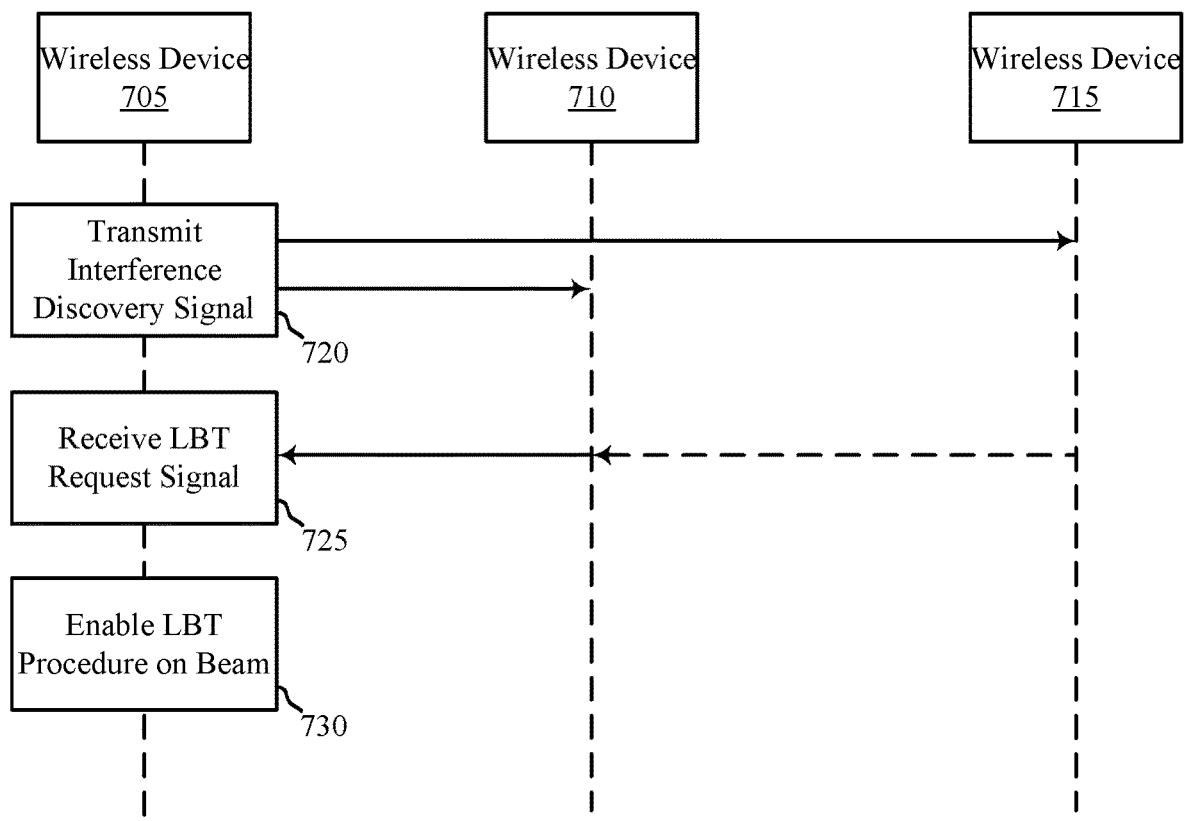
FIG. 7 illustrates an example of a process that supports OD-LBT in accordance with aspects of the present disclosure.

FIG. 7 illustrates an example of a process 700 that supports OD-LBT in accordance with various aspects of the present disclosure. In some examples, process 700 may implement aspects of wireless communication systems 100/200/400, periodic interference discovery procedure 300, and/or timing diagrams 500/600. Process 700 may include a wireless device 705, a wireless device 710, and a wireless device 715, each of which may be a UE or base station, which may be examples of the corresponding devices described herein. Wireless device 705 may be considered a potential aggressor node and wireless devices 710 and/or 715 may be considered potential victim nodes.

At 720, wireless device 705 may transmit an interference discovery signal for each active beam configuration. The interference discovery signal may be transmitted during an interference discovery window. The interference discovery signal may include a synchronization signal, or a CSI-RS, or a downlink OD-LBT reference signal, or a sounding reference signal, or an uplink OD-LBT reference signal, or a combination thereof.

At 725, wireless device 705 may receive an LBT request signal identifying at least one beam configuration that may cause interference, e.g., an uplink or a downlink beam configuration. The LBT request signal may be received during the interference discovery window and in response to the interference discovery signal. The LBT request signal may be received from one or both of wireless devices 710 or 715. For example, wireless devices 710 and/or 715 may be potential victim nodes that receives the interference discovery signal and responds with the LBT request signal directly to wireless device 705. In another example, wireless device 715 may be a potential victim node that responds with the LBT request signal to wireless device 710. Wireless device 710 may forward the LBT request signal on to wireless device 705 in this instance.

In some aspects, the LBT request signal may include a bit or field indicating that the identified at least one beam configuration causes interference, or a transmit power indication, or an acceptable interference level indication, or an acceptable interference rank, or a combination thereof.

At 730, wireless device 705 may selectively enable an LBT procedure for the identified active beam configuration. The LBT procedure may be enabled on the active beam configuration for a period extending until a next interference discovery window. The LBT procedure may include an energy detection based LBT procedure, a preamble detection based LBT procedure, or a receiver-centric LBT procedure. In some aspects, a different energy detection threshold or preamble detection threshold may be selected for each beam configuration with an enabled LBT procedure.

In some aspects, wireless device 705 may enable the LBT procedure on all active beam configurations when a threshold number of the active beam configurations have the LBT procedure enabled.

Figure 8:
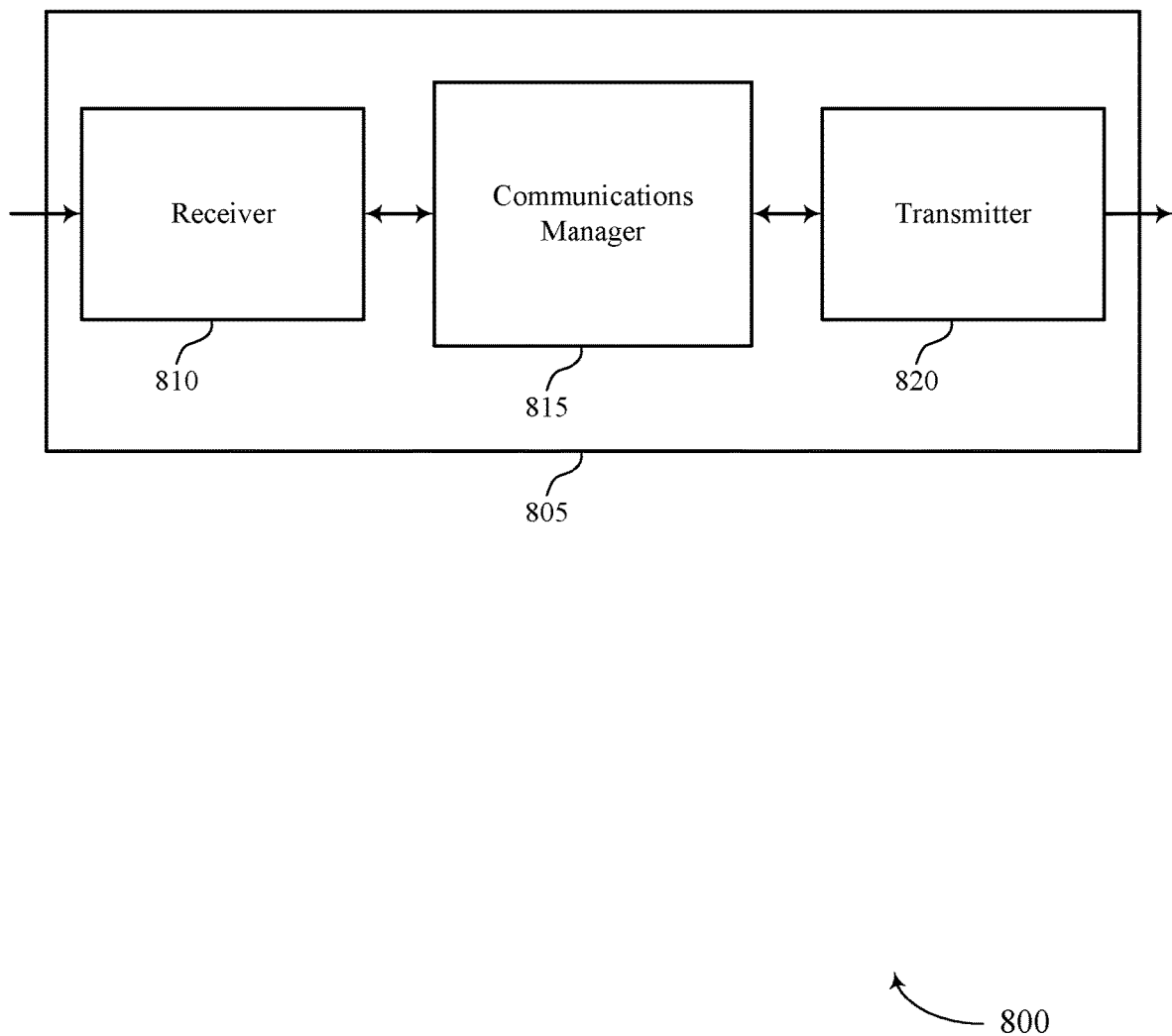
FIGS. 8 through 10 show block diagrams of a device that supports OD-LBT in accordance with aspects of the present disclosure.

FIG. 8 shows a block diagram 800 of a wireless device 805 that supports OD-LBT in accordance with aspects of the present disclosure. Wireless device 805 may be an example of aspects of a UE 115 or base station 105 as described herein. Wireless device 805 may include receiver 810, communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to OD-LBT, etc.). Information may be passed on to other components of the device. The receiver 810 may be an example of aspects of the transceiver 1135 described with reference to FIG. 11. The receiver 810 may utilize a single antenna or a set of antennas.

Communications manager 815 may be an example of aspects of the UE communications manager 1115 described with reference to FIG. 11.

Communications manager 815 and/or at least some of its various sub-components may be implemented in hardware, software executed by a processor, firmware, or any combination thereof. If implemented in software executed by a processor, the functions of the communications manager 815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The communications manager 815 and/or at least some of its various sub-components may be physically located at various positions, including being distributed such that portions of functions are implemented at different physical locations by one or more physical devices. In some examples, communications manager 815 and/or at least some of its various sub-components may be a separate and distinct component in accordance with various aspects of the present disclosure. In other examples, communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 815 may determine an interference status of each beam configuration of a set of active beam configurations for a shared radio frequency spectrum band, determine a beam-specific LBT requirement for each beam configuration of the set of active beam configurations based on the determined interference status of each beam configuration, and selectively enable an LBT procedure on a per-beam basis according to the determined beam-specific LBT requirement for each beam configuration.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Figure 9:
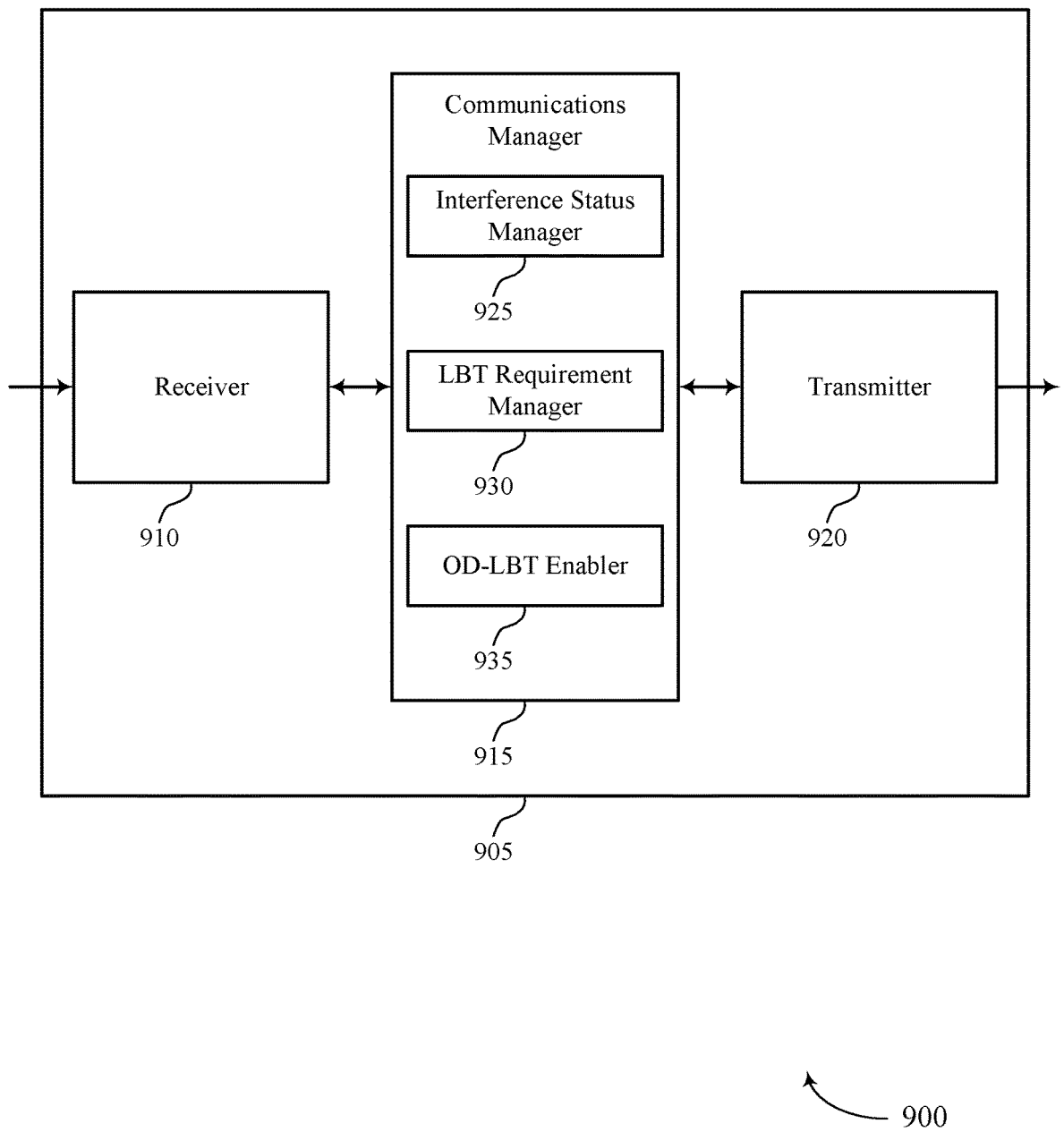

FIG. 9 shows a block diagram 900 of a wireless device 905 that supports OD-LBT in accordance with aspects of the present disclosure. Wireless device 905 may be an example of aspects of a wireless device 805 or a UE 115 or base station 105 as described with reference to FIG. 8. Wireless device 905 may include receiver 910, communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to OD-LBT, etc.). Information may be passed on to other components of the device. The receiver 910 may be an example of aspects of the transceiver 1135 described with reference to FIG. 11. The receiver 910 may utilize a single antenna or a set of antennas.

Communications manager 915 may be an example of aspects of the UE communications manager 1115 described with reference to FIG. 11.

Communications manager 915 may also include interference status manager 925, LBT requirement manager 930, and OD-LBT enabler 935.

Interference status manager 925 may determine an interference status of each beam configuration of a set of active beam configurations for a shared radio frequency spectrum band. In some cases, determining the interference status of each beam configuration of the set of active beam configurations includes: selecting a different energy detection threshold or preamble detection threshold for each beam configuration of the set of active beam configurations.

LBT requirement manager 930 may determine a beam-specific LBT requirement for each beam configuration of the set of active beam configurations based on the determined interference status of each beam configuration. In some cases, the set of active beam configurations includes active beam configurations that are available for transmission within a periodic schedule. In some cases, the set of active beam configurations include at least one of: uplink active beam configurations or downlink active beam configurations. In some cases, the LBT procedure includes at least one of: an energy detection based LBT procedure, a preamble detection based LBT procedure, or a receiver-centric LBT procedure.

OD-LBT enabler 935 may selectively enable an LBT procedure on a per-beam basis according to the determined beam-specific LBT requirement for each beam configuration.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
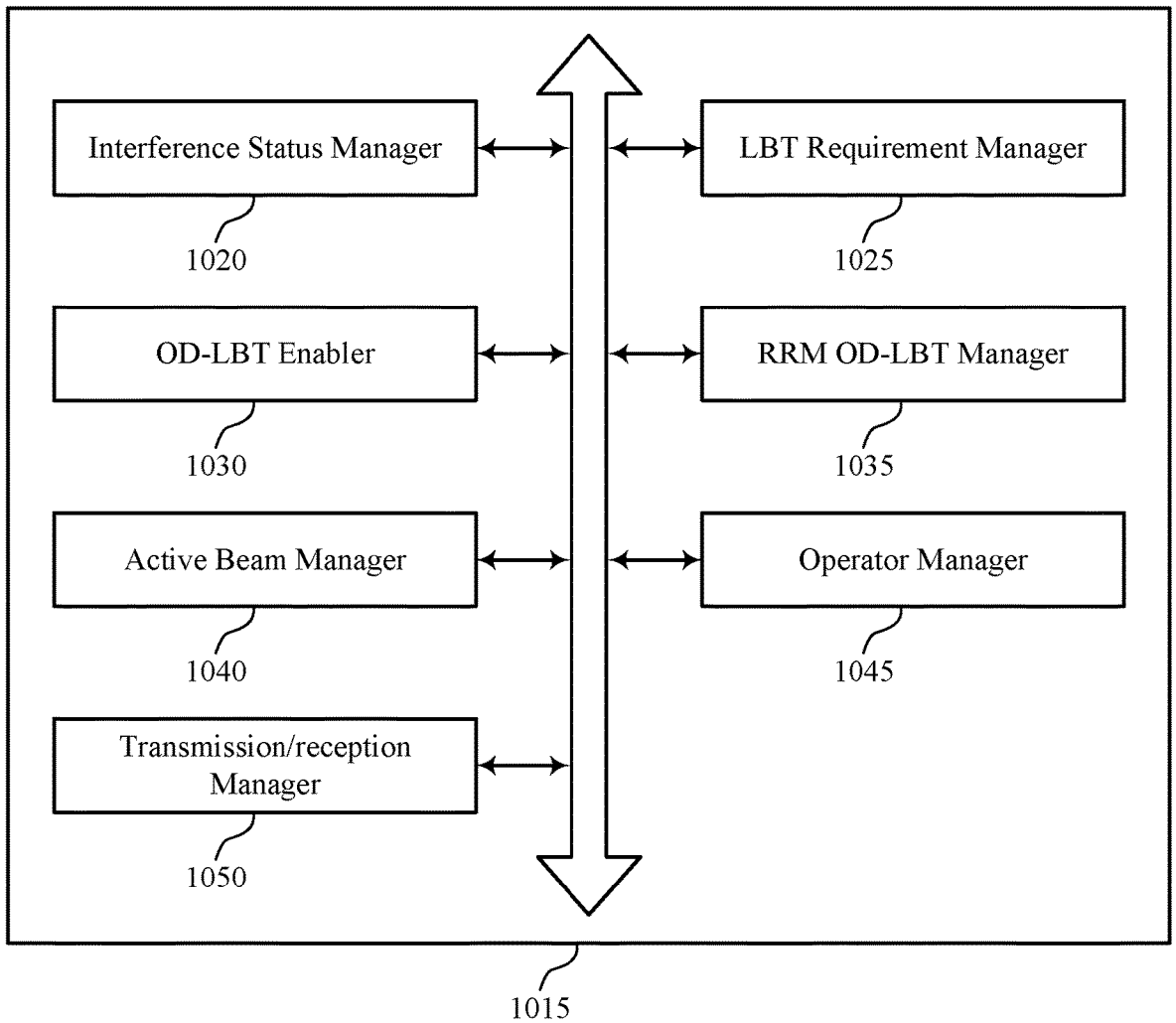

FIG. 10 shows a block diagram 1000 of a communications manager 1015 that supports OD-LBT in accordance with aspects of the present disclosure. The communications manager 1015 may be an example of aspects of a communications manager 815, a communications manager 915, or a UE communications manager 1115 described with reference to FIGS. 8, 9, and 11. The communications manager 1015 may include interference status manager 1020, LBT requirement manager 1025, OD-LBT enabler 1030, RRM OD-LBT manager 1035, active beam manager 1040, operator manager 1045, and transmission/reception manager 1050. Each of these modules may communicate, directly or indirectly, with one another (e.g., via one or more buses).

Interference status manager 1020 may determine an interference status of each beam configuration of a set of active beam configurations for a shared radio frequency spectrum band. In some cases, determining the interference status of each beam configuration of the set of active beam configurations includes: selecting a different energy detection threshold or preamble detection threshold for each beam configuration of the set of active beam configurations.

LBT requirement manager 1025 may determine a beam-specific LBT requirement for each beam configuration of the set of active beam configurations based on the determined interference status of each beam configuration. In some cases, the set of active beam configurations includes active beam configurations that are available for transmission within a periodic schedule. In some cases, the set of active beam configurations include at least one of: uplink active beam configurations or downlink active beam configurations. In some cases, the LBT procedure includes at least one of: an energy detection based LBT procedure, a preamble detection based LBT procedure, or a receiver-centric LBT procedure.

OD-LBT enabler 1030 may selectively enable an LBT procedure on a per-beam basis according to the determined beam-specific LBT requirement for each beam configuration.

RRM OD-LBT manager 1035 may receive, during the interference discovery window and based on the interference discovery signal, an LBT request signal identifying at least one beam configuration of the set of active beam configurations, enable, during the interference discovery window and for a period extending until a next periodic interference discovery window, the LBT procedure for the identified beam configuration based on the LBT request signal, LBT request signals from different operators are associated with orthogonal resources, and enable the LBT procedure for the identified at least one beam configuration for a time period between repeated interference discovery windows. In some cases, determining the interference status of each beam configuration of the set of active beam configurations includes: performing a periodic interference discovery procedure using each beam configuration of the set of active beam configurations to determine whether a transmission by the first wireless device to a second wireless device using that beam configuration causes interference to a third wireless device. In some cases, the interference discovery signal includes at least one of: a synchronization signal, or a channel state information reference signal, or a downlink on-demand LBT reference signal, or a sounding reference signal, or an uplink on-demand LBT reference signal, or a combination thereof. In some cases, the LBT request signal is received from the third wireless device. In some cases, performing the interference discovery procedure includes: transmitting, during an interference discovery window, an interference discovery signal for each beam configuration of the set of active beam configurations. In some cases, the identified at least one beam configuration includes an uplink beam configuration. In some cases, the LBT request signal includes at least one of: a bit or field indicating that the identified at least one beam configuration causes interference, or a transmit power indication, or an acceptable interference level indication, or an acceptable interference rank, or a combination thereof. In some cases, the LBT request signal is received from the second wireless device, the second wireless device forwarding the request from the third wireless device.

Active beam manager 1040 may determine that the LBT procedure is enabled for a threshold amount of the set of active beam configurations and enable the LBT procedure on all of the available active beam configurations based on the determination.

Operator manager 1045 may identify a first interference discovery window based on a first operator associated with the first wireless device and identify a second interference discovery window based on a second operator that is not associated with the first wireless device, where the first interference discovery window is orthogonal in the time domain with respect to the second interference discovery window. In some cases, the determining the interference status of each beam configuration of the set of active beam configurations is based on the first interference discovery window and the second interference discovery window.

Transmission/reception manager 1050 may identify a first interference discovery window associated with uplink transmissions and identify a second interference discovery window associated with downlink transmissions, where the first interference discovery window is orthogonal in the time domain with respect to the second interference discovery window. In some cases, the determining the interference status of each beam configuration of the set of active beam configurations is based on the first interference discovery window and the second interference discovery window.

Figure 11:
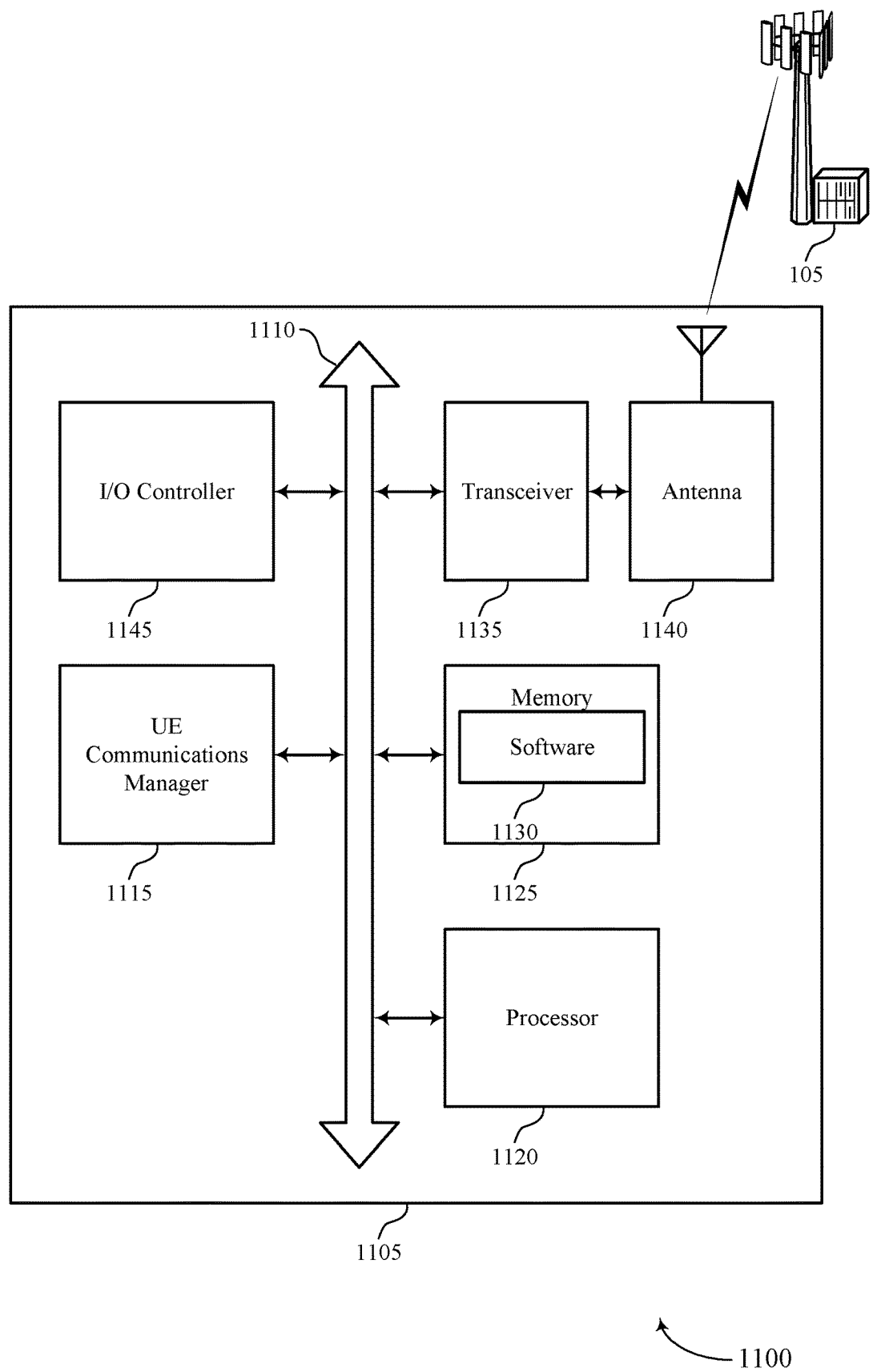
FIG. 11 illustrates a block diagram of a system including a user equipment (UE) that supports OD-LBT in accordance with aspects of the present disclosure.

FIG. 11 shows a diagram of a system 1100 including a device 1105 that supports OD-LBT in accordance with aspects of the present disclosure. Device 1105 may be an example of or include the components of wireless device 805, wireless device 905, or a UE 115 as described herein, e.g., with reference to FIGS. 8 and 9. Device 1105 may include components for bi-directional voice and data communications including components for transmitting and receiving communications, including UE communications manager 1115, processor 1120, memory 1125, software 1130, transceiver 1135, antenna 1140, and I/O controller 1145. These components may be in electronic communication via one or more buses (e.g., bus 1110). Device 1105 may communicate wirelessly with one or more base stations 105.

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting OD-LBT).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware or software operation such as the interaction with peripheral components or devices.

Software 1130 may include code to implement aspects of the present disclosure, including code to support OD-LBT. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described herein. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system. In other cases, I/O controller 1145 may represent or interact with a modem, a keyboard, a mouse, a touchscreen, or a similar device. In some cases, I/O controller 1145 may be implemented as part of a processor. In some cases, a user may interact with device 1105 via I/O controller 1145 or via hardware components controlled by I/O controller 1145.

Figure 12:
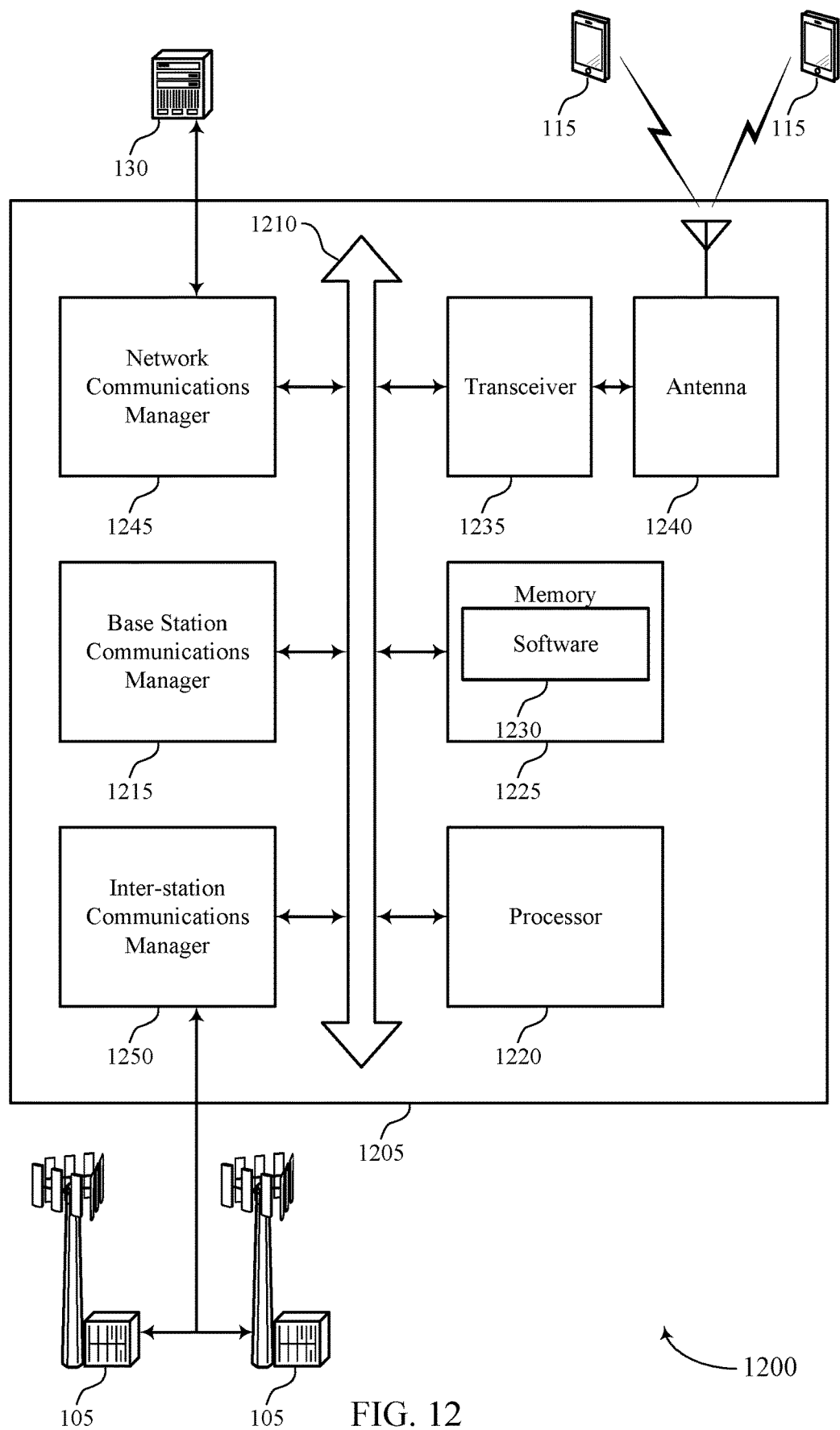
FIG. 12 illustrates a block diagram of a system including a base station that supports OD-LBT in accordance with aspects of the present disclosure.

FIG. 12 shows a diagram of a system 1200 including a device 1205 that supports OD-LBT in accordance with aspects of the present disclosure. Device 1205 may be an example of or include the components of wireless device 905, wireless device 1005, or a base station 105 as described herein, e.g., with reference to FIGS. 9 and 10. Device 1205 may include components for bi-directional voice and data communications including components for transmitting and receiving communications, including base station communications manager 1215, processor 1220, memory 1225, software 1230, transceiver 1235, antenna 1240, network communications manager 1245, and inter-station communications manager 1250. These components may be in electronic communication via one or more buses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting OD-LBT).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support OD-LBT. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described herein. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Inter-station communications manager 1250 may manage communications with other base station 105, and may include a controller or scheduler for controlling communications with UEs 115 in cooperation with other base stations 105. For example, the inter-station communications manager 1250 may coordinate scheduling for transmissions to UEs 115 for various interference mitigation techniques such as beamforming or joint transmission. In some examples, inter-station communications manager 1250 may provide an X2 interface within an LTE/LTE-A wireless communication network technology to provide communication between base stations 105.

Figure 13:
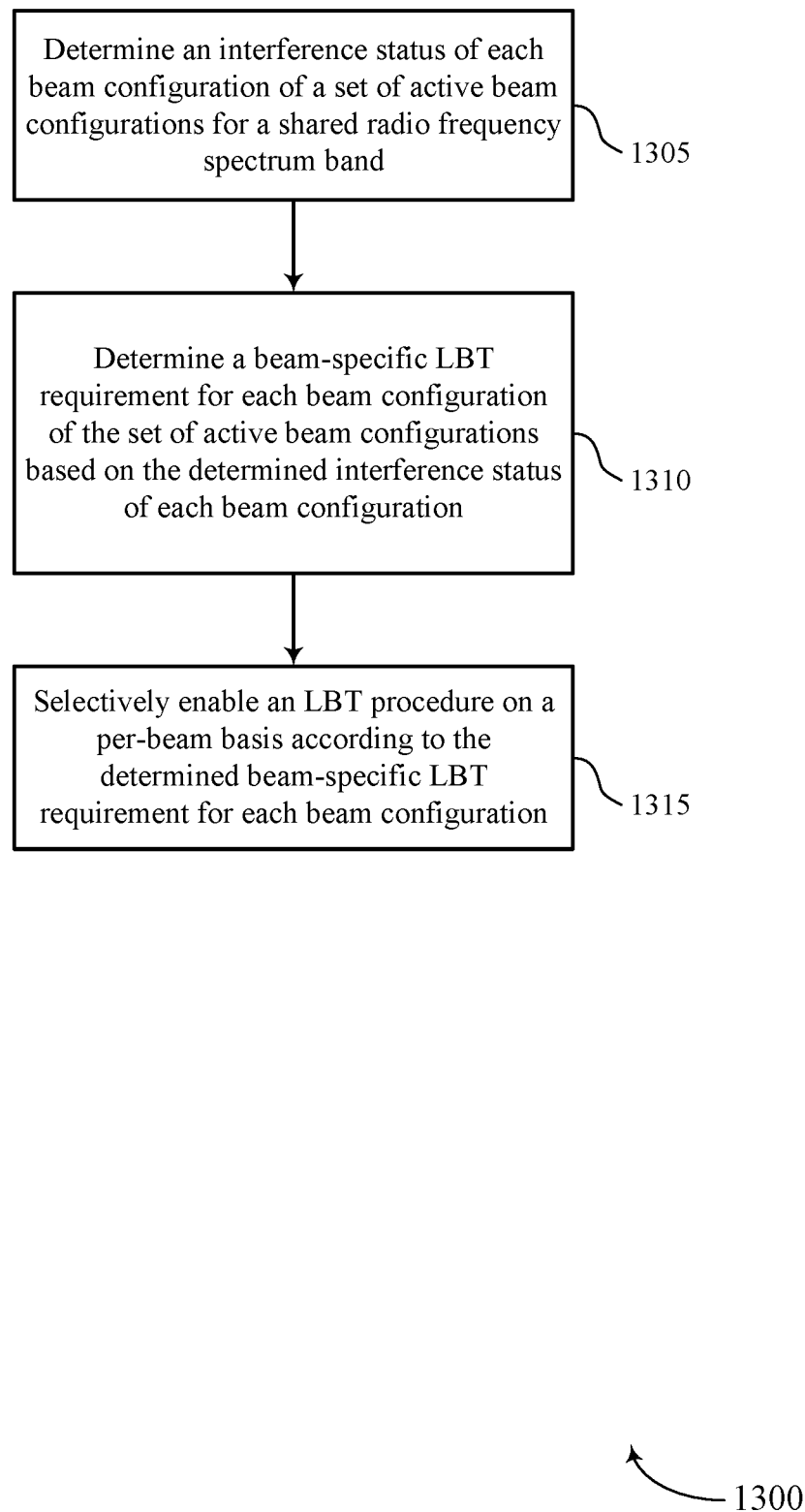
FIGS. 13 through 15 illustrate methods for OD-LBT in accordance with aspects of the present disclosure.

FIG. 13 shows a flowchart illustrating a method 1300 for OD-LBT in accordance with aspects of the present disclosure. The operations of method 1300 may be implemented by a UE 115 or base station 105 or its components as described herein. For example, the operations of method 1300 may be performed by a communications manager as described with reference to FIGS. 8 through 10. In some examples, a UE 115 or base station 105 may execute a set of codes to control the functional elements of the device to perform the functions described herein. Additionally or alternatively, the UE 115 or base station 105 may perform aspects of the functions described below using special-purpose hardware.

At 1305 the UE 115 or base station 105 may determine an interference status of each beam configuration of a plurality of active beam configurations for a shared radio frequency spectrum band. The operations of 1305 may be performed according to the methods described herein. In certain examples, aspects of the operations of 1305 may be performed by an interference status manager as described with reference to FIGS. 8 through 10.

At 1310 the UE 115 or base station 105 may determine a beam-specific LBT requirement for each beam configuration of the plurality of active beam configurations based at least in part on the determined interference status of each beam configuration. The operations of 1310 may be performed according to the methods described herein. In certain examples, aspects of the operations of 1310 may be performed by an LBT requirement manager as described with reference to FIGS. 8 through 10.

At 1315 the UE 115 or base station 105 may selectively enable an LBT procedure on a per-beam basis according to the determined beam-specific LBT requirement for each beam configuration. The operations of 1315 may be performed according to the methods described herein. In certain examples, aspects of the operations of 1315 may be performed by a OD-LBT enabler as described with reference to FIGS. 8 through 10.

Figure 14:
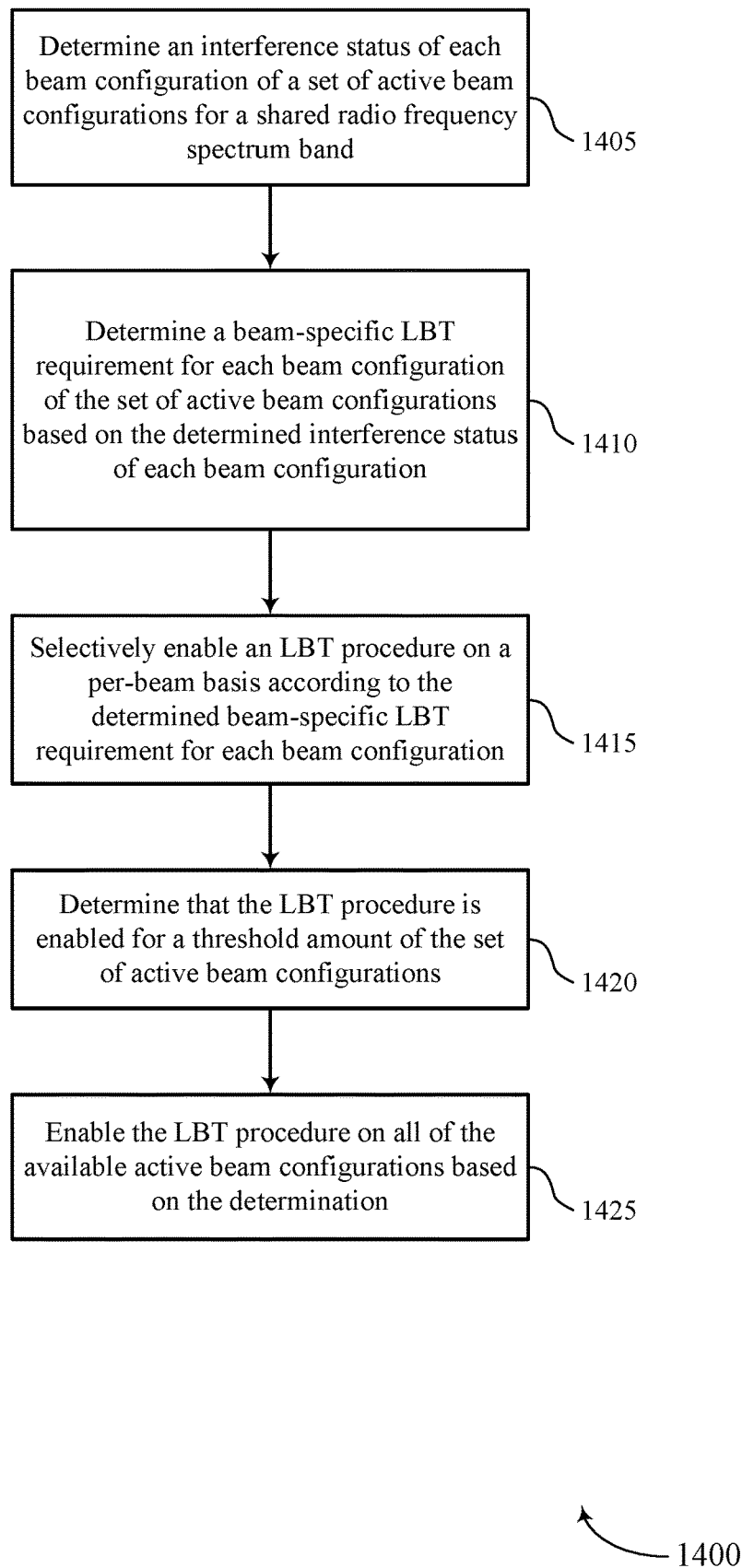

FIG. 14 shows a flowchart illustrating a method 1400 for OD-LBT in accordance with aspects of the present disclosure. The operations of method 1400 may be implemented by a UE 115 or base station 105 or its components as described herein. For example, the operations of method 1400 may be performed by a communications manager as described with reference to FIGS. 8 through 10. In some examples, a UE 115 or base station 105 may execute a set of codes to control the functional elements of the device to perform the functions described herein. Additionally or alternatively, the UE 115 or base station 105 may perform aspects of the functions described herein using special-purpose hardware.

At 1405 the UE 115 or base station 105 may determine an interference status of each beam configuration of a plurality of active beam configurations for a shared radio frequency spectrum band. The operations of 1405 may be performed according to the methods described herein. In certain examples, aspects of the operations of 1405 may be performed by an interference status manager as described with reference to FIGS. 8 through 10.

At 1410 the UE 115 or base station 105 may determine a beam-specific LBT requirement for each beam configuration of the plurality of active beam configurations based at least in part on the determined interference status of each beam configuration. The operations of 1410 may be performed according to the methods described herein. In certain examples, aspects of the operations of 1410 may be performed by an LBT requirement manager as described with reference to FIGS. 8 through 10.

At 1415 the UE 115 or base station 105 may selectively enable an LBT procedure on a per-beam basis according to the determined beam-specific LBT requirement for each beam configuration. The operations of 1415 may be performed according to the methods described herein. In certain examples, aspects of the operations of 1415 may be performed by a OD-LBT enabler as described with reference to FIGS. 8 through 10.

At 1420 the UE 115 or base station 105 may determine that the LBT procedure is enabled for a threshold amount of the plurality of active beam configurations. The operations of 1420 may be performed according to the methods described herein. In certain examples, aspects of the operations of 1420 may be performed by an active beam manager as described with reference to FIGS. 8 through 10.

At 1425 the UE 115 or base station 105 may enable the LBT procedure on all of the available active beam configurations based at least in part on the determination. The operations of 1425 may be performed according to the methods described herein. In certain examples, aspects of the operations of 1425 may be performed by an active beam manager as described with reference to FIGS. 8 through 10.

Figure 15:
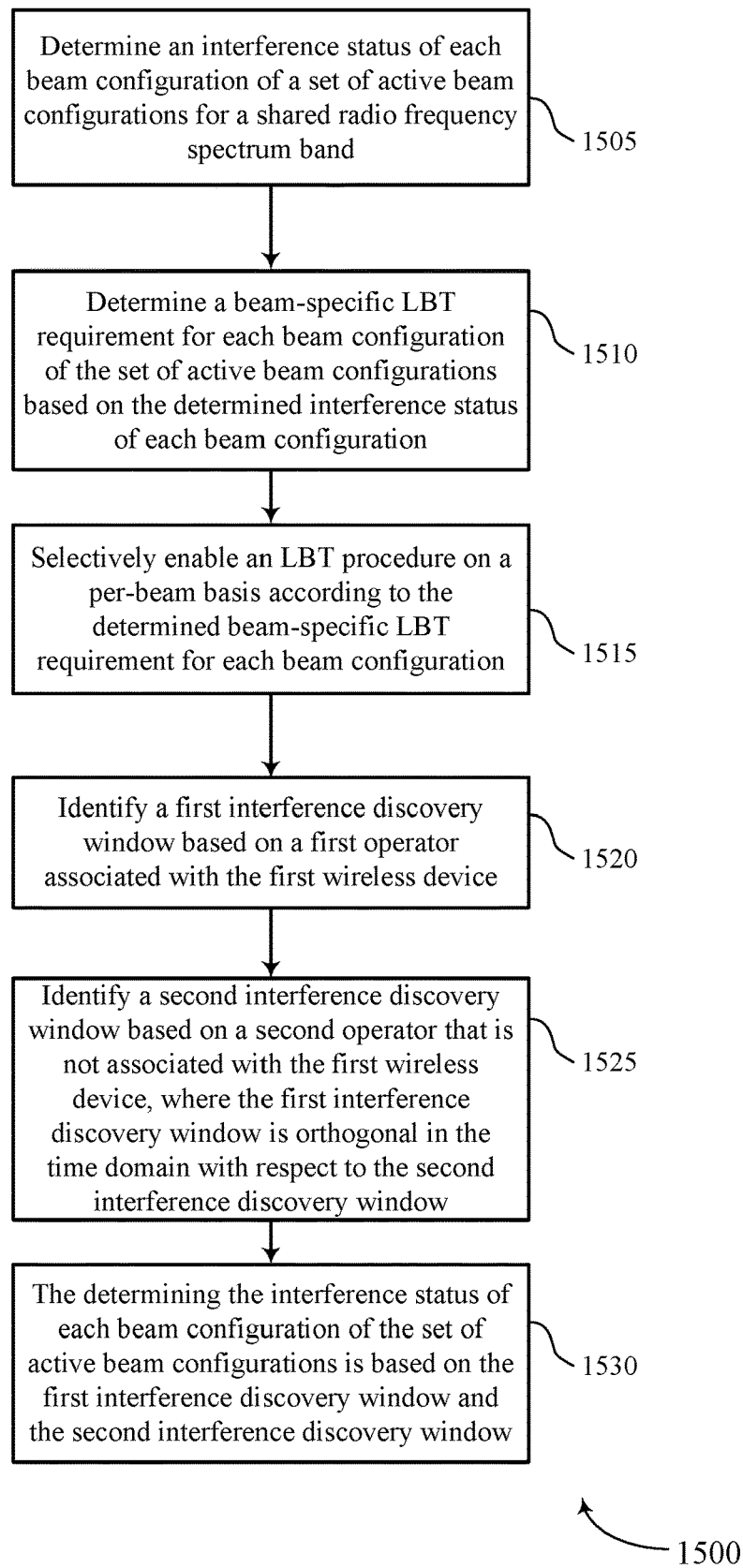

FIG. 15 shows a flowchart illustrating a method 1500 for OD-LBT in accordance with aspects of the present disclosure. The operations of method 1500 may be implemented by a UE 115 or base station 105 or its components as described herein. For example, the operations of method 1500 may be performed by a communications manager as described with reference to FIGS. 8 through 10. In some examples, a UE 115 or base station 105 may execute a set of codes to control the functional elements of the device to perform the functions described herein. Additionally or alternatively, the UE 115 or base station 105 may perform aspects of the functions described herein using special-purpose hardware.

At 1505 the UE 115 or base station 105 may determine an interference status of each beam configuration of a plurality of active beam configurations for a shared radio frequency spectrum band. The operations of 1505 may be performed according to the methods described herein. In certain examples, aspects of the operations of 1505 may be performed by an interference status manager as described with reference to FIGS. 8 through 10.

At 1510 the UE 115 or base station 105 may determine a beam-specific LBT requirement for each beam configuration of the plurality of active beam configurations based at least in part on the determined interference status of each beam configuration. The operations of 1510 may be performed according to the methods described herein. In certain examples, aspects of the operations of 1510 may be performed by an LBT requirement manager as described with reference to FIGS. 8 through 10.

At 1515 the UE 115 or base station 105 may selectively enable an LBT procedure on a per-beam basis according to the determined beam-specific LBT requirement for each beam configuration. The operations of 1515 may be performed according to the methods described herein. In certain examples, aspects of the operations of 1515 may be performed by a OD-LBT enabler as described with reference to FIGS. 8 through 10.

At 1520 the UE 115 or base station 105 may identify a first interference discovery window based at least in part on a first operator associated with the first wireless device. The operations of 1520 may be performed according to the methods described herein. In certain examples, aspects of the operations of 1520 may be performed by an operator manager as described with reference to FIGS. 8 through 10.

At 1525 the UE 115 or base station 105 may identify a second interference discovery window based at least in part on a second operator that is not associated with the first wireless device, where the first interference discovery window is orthogonal in the time domain with respect to the second interference discovery window. The operations of 1525 may be performed according to the methods described herein. In certain examples, aspects of the operations of 1525 may be performed by an operator manager as described with reference to FIGS. 8 through 10.

At 1530 the UE 115 or base station 105 may the determining the interference status of each beam configuration of the plurality of active beam configurations is based at least in part on the first interference discovery window and the second interference discovery window. The operations of 1530 may be performed according to the methods described herein. In certain examples, aspects of the operations of 1530 may be performed by an operator manager as described with reference to FIGS. 8 through 10.

In some cases, the determining the interference status of each beam configuration of the plurality of active beam configurations is based at least in part on the first interference discovery window and the second interference discovery window.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    determining an interference status of each beam configuration of a plurality of active beam configurations for a shared radio frequency spectrum band;
    determining a beam-specific listen-before-talk (LBT) requirement for each beam configuration of the plurality of active beam configurations based at least in part on the determined interference status of each beam configuration; and
    selectively enabling and disabling an LBT procedure on a per-beam basis according to the determined beam-specific LBT requirement for each beam configuration.

2. The method of claim 1, wherein determining the interference status of each beam configuration of the plurality of active beam configurations comprises:
    performing a periodic interference discovery procedure using each beam configuration of the plurality of active beam configurations to determine whether a transmission by a first wireless device to a second wireless device using that beam configuration causes interference to a third wireless device.

3. The method of claim 2, wherein performing the interference discovery procedure comprises:
    transmitting, during an interference discovery window, an interference discovery signal for each beam configuration of the plurality of active beam configurations;
    receiving, during the interference discovery window and based at least in part on the interference discovery signal, an LBT request signal requesting communications on at least one beam configuration of the plurality of active beam configurations; and
    enabling, during the interference discovery window and for a period extending until a next periodic interference discovery window, the LBT procedure for the at least one beam configuration based at least in part on the LBT request signal.

4. The method of claim 3, wherein the LBT request signal is received from the third wireless device.

5. The method of claim 3, wherein the LBT request signal is received from the second wireless device, the second wireless device forwarding the LBT request from the third wireless device.

6. The method of claim 5, wherein the at least one beam configuration comprises an uplink beam configuration.

7. The method of claim 3, wherein LBT request signals from different operators are associated with orthogonal resources.

8. The method of claim 3, wherein the LBT request signal comprises at least one of: a bit or field indicating that the at least one beam configuration causes interference, or a transmit power indication, or an acceptable interference level indication, or an acceptable interference rank, or a combination thereof.

9. The method of claim 2, further comprising:
    enabling and disabling the LBT procedure for the at least one beam configuration for a time period between repeated interference discovery windows.

10. The method of claim 2, wherein the interference discovery signal comprises at least one of: a synchronization signal, or a channel state information reference signal, or a downlink on-demand LBT reference signal, or a sounding reference signal, or an uplink on-demand LBT reference signal, or a combination thereof.

11. The method of claim 1, further comprising:
    determining that the LBT procedure is enabled for a threshold amount of the plurality of active beam configurations; and
    enabling the LBT procedure on all of the enabled active beam configurations based at least in part on the determination.

12. The method of claim 1, wherein determining the interference status of each beam configuration of the plurality of active beam configurations comprises:
    selecting a different energy detection threshold or preamble detection threshold for each beam configuration of the plurality of active beam configurations.

13. The method of claim 1, further comprising:
    identifying a first interference discovery window based at least in part on a first operator associated with a first wireless device;
    identifying a second interference discovery window based at least in part on a second operator that is not associated with the first wireless device, wherein the first interference discovery window is orthogonal in a time domain with respect to the second interference discovery window; and
    the determining the interference status of each beam configuration of the plurality of active beam configurations is based at least in part on the first interference discovery window and the second interference discovery window.

14. The method of claim 1, further comprising:
identifying a first interference discovery window associated with uplink transmissions;
identifying a second interference discovery window associated with downlink transmissions, wherein the first interference discovery window is orthogonal in a time domain with respect to the second interference discovery window; and
the determining the interference status of each beam configuration of the plurality of active beam configurations is based at least in part on the first interference discovery window and the second interference discovery window.

15. The method of claim 1, wherein the plurality of active beam configurations comprises active beam configurations that are available for transmission within a periodic schedule.

16. The method of claim 1, wherein the plurality of active beam configurations comprise at least one of: uplink active beam configurations or downlink active beam configurations.

17. The method of claim 1, wherein the LBT procedure comprises at least one of: an energy detection based LBT procedure, a preamble detection based LBT procedure, or a receiver-centric LBT procedure.

18. An apparatus for wireless communication, comprising:
means for determining an interference status of each beam configuration of a plurality of active beam configurations for a shared radio frequency spectrum band;
means for determining a beam-specific listen-before-talk (LBT) requirement for each beam configuration of the plurality of active beam configurations based at least in part on the determined interference status of each beam configuration; and
means for selectively enabling and disabling an LBT procedure on a per-beam basis according to the determined beam-specific LBT requirement for each beam configuration.

19. The apparatus of claim 18, wherein the means for determining the interference status of each beam configuration of the plurality of active beam configurations comprises:
means for performing a periodic interference discovery procedure using each beam configuration of the plurality of active beam configurations to determine whether a transmission by a first wireless device to a second wireless device using that beam configuration causes interference to a third wireless device.

20. An apparatus for wireless communication, comprising:
a processor;
memory in electronic communication with the processor; and
instructions stored in the memory and executable by the processor to cause the apparatus to:
determine an interference status of each beam configuration of a plurality of active beam configurations for a shared radio frequency spectrum band,
determine a beam-specific listen-before-talk (LBT) requirement for each beam configuration of the plurality of active beam configurations based at least in part on the determined interference status of each beam configuration, and
selectively enable and disable an LBT procedure on a per-beam basis according to the determined beam-specific LBT requirement for each beam configuration.

21. The apparatus of claim 20, wherein the instructions to determine the interference status of each beam configuration of the plurality of active beam configurations are executable by the processor to cause the apparatus to:
perform a periodic interference discovery procedure using each beam configuration of the plurality of active beam configurations to determine whether a transmission by a first wireless device to a second wireless device using that beam configuration causes interference to a third wireless device.

22. The apparatus of claim 21, wherein the instructions to perform the interference discovery procedure are executable by the processor to cause the apparatus to:
transmit, during an interference discovery window, an interference discovery signal for each beam configuration of the plurality of active beam configurations,
receive, during the interference discovery window and based at least in part on the interference discovery signal, an LBT request signal requesting communications on at least one beam configuration of the plurality of active beam configurations, and
enable, during the interference discovery window and for a period extending until a next periodic interference discovery window, the LBT procedure for the at least one beam configuration based at least in part on the LBT request signal.

23. The apparatus of claim 22, wherein the LBT request signal is received from the third wireless device.

24. The apparatus of claim 22, wherein the LBT request signal is received from the second wireless device, the second wireless device forwarding the LBT request from the third wireless device.

25. The apparatus of claim 24, wherein the at least one beam configuration comprises an uplink beam configuration.

26. The apparatus of claim 22, wherein LBT request signals from different operators are associated with orthogonal resources.

27. The apparatus of claim 22, wherein the LBT request signal comprises at least one of: a bit or field indicating that the at least one beam configuration causes interference, or a transmit power indication, or an acceptable interference level indication, or an acceptable interference rank, or a combination thereof.

28. The apparatus of claim 21, wherein the instructions are further executable by the processor to cause the apparatus to:
enable and disable the LBT procedure for the at least one beam configuration for a time period between repeated interference discovery windows.

29. The apparatus of claim 21, wherein the interference discovery signal comprises at least one of: a synchronization signal, or a channel state information reference signal, or a downlink on-demand LBT reference signal, or a sounding reference signal, or an uplink on-demand LBT reference signal, or a combination thereof.

30. A non-transitory computer-readable medium storing code for wireless communication, the code comprising instructions executable by a processor to:
determine an interference status of each beam configuration of a plurality of active beam configurations for a shared radio frequency spectrum band;
determine a beam-specific listen-before-talk (LBT) requirement for each beam configuration of the plurality of active beam configurations based at least in part on the determined interference status of each beam configuration; and selectively enable and disable an LBT procedure on a per-beam basis according to the determined beam-specific LBT requirement for each beam configuration.

* * * * *